(12) United States Patent
Smardanski et al.

(10) Patent No.: US 12,493,969 B2
(45) Date of Patent: Dec. 9, 2025

(54) AUTOREGISTRATION OF THREE-DIMENSIONAL DIGITAL STRUCTURES

(71) Applicant: EXOCAD GMBH, Darmstadt (DE)

(72) Inventors: Bilian Smardanski, Mannheim (DE); Stefan Boettner, Muehltal (DE)

(73) Assignee: EXOCAD GMBH, Darmstadt (DE)

( * ) Notice: Subject to any disclaimer, the term of this patent is extended or adjusted under 35 U.S.C. 154(b) by 376 days.

(21) Appl. No.: 18/198,398

(22) Filed: May 17, 2023

(65) Prior Publication Data
US 2024/0386582 A1     Nov. 21, 2024

(51) Int. Cl.
*G06T 7/30*     (2017.01)
*G06T 17/20*     (2006.01)

(52) U.S. Cl.
CPC ............... *G06T 7/30* (2017.01); *G06T 17/20* (2013.01)

(58) Field of Classification Search
CPC . G06T 7/30; G06T 17/20; G06T 2207/30036; G06T 7/0012; G06T 7/33; G06V 20/653
See application file for complete search history.

(56) References Cited

U.S. PATENT DOCUMENTS

| | | | |
|---|---|---|---|
| 2009/0316966 A1* | 12/2009 | Marshall | G16H 50/30 382/128 |
| 2010/0209005 A1 | 8/2010 | Rudin et al. | |
| 2023/0121899 A1* | 4/2023 | Naumovets | A61C 7/002 433/24 |
| 2023/0293271 A1* | 9/2023 | Knudby | A61C 9/0053 382/154 |
| 2023/0363732 A1* | 11/2023 | Jaehn | A61B 6/03 |

OTHER PUBLICATIONS

Chung et al., "Automatic Registration between Cone-Beam CT and Scanned Surface via Deep-Pose Regression Neural Networks and Clustered Similarities", arXiv: 1907.12250. (Year: 2019).*

(Continued)

*Primary Examiner* — Vu Le
*Assistant Examiner* — Rachel Anne Ometz
(74) *Attorney, Agent, or Firm* — PERRY + CURRIER INC.

(57) ABSTRACT

Disclosed is a computer-implemented method for registering a first and a second three-dimensional digital structure. The first and second three-dimensional digital structures are received. First structural features of the first three-dimensional digital structure and second structural features of the second three-dimensional digital structure are determined. A first plurality of first feature sets of first structural features and a second plurality of second feature sets of second structural features are defined. Pairs of first and second feature sets describing first and second n-gons satisfying a congruence criterion are identified. To each pair of first and second feature set a point in a transformation space is assigned. A rigid spatial transformation for registering the first three-dimensional digital structure with the second three-dimensional digital structure is determined using a clustering of the points assigned in the transformation space. The first and second three-dimensional digital structure are registered using the determined rigid spatial transformation.

20 Claims, 32 Drawing Sheets

(56) References Cited

OTHER PUBLICATIONS

Chung, Minyoung, et al. "Automatic Registration between Cone-Beam CT and Scanned Surface via Deep-Pose Regression Neural Networks and Clustered Similarities." arXiv preprint arXiv: 1907.12250 (2019).
Jang, Tae Jun, et al. "Fully automatic integration of dental CBCT images and full-arch intraoral impressions with stitching error correction via individual tooth segmentation and identification." Medical Image Analysis 93 (2024): 103096.
Rusu, Radu Bogdan et al. "Fast point feature histograms (FPFH) for 3D registration." 2009 IEEE international conference on robotics and automation. IEEE, 2009.

* cited by examiner

AUTOREGISTRATION OF THREE-DIMENSIONAL DIGITAL STRUCTURES

FIELD OF THE INVENTION

The invention relates to the field of image registration. More particularly, the invention relates to a computer-implemented method for registering a first three-dimensional digital structure and a second three-dimensional digital structure.

BACKGROUND

In image processing of a three-dimensional physical structure, like, e.g., some physiological object, it may be necessary to compare or integrate different three-dimensional digital structures resulting from different scan data of the three-dimensional physical structure. In order to be able to compare or integrate different three-dimensional digital structures, a registration of the three-dimensional physical structures may be required. Image registration refers to a transforming of different sets of data, i.e., the different three-dimensional digital structures, into one coordinate system. Registering different three-dimensional digital structures may be a challenging task.

It is an objective to provide for a computer-implemented method, a computer program product and a computer device for registering a first three-dimensional digital structure and a second three-dimensional digital structure. The objectives underlying the invention are solved by the features of the independent claims.

SUMMARY

In one aspect a computer-implemented method is disclosed for registering a first three-dimensional digital structure and a second three-dimensional digital structure. The first three-dimensional digital structure represents first scan data of a three-dimensional physical structure. The second three-dimensional digital structure represents second scan data of the three-dimensional physical structure.

The method comprises receiving the first three-dimensional digital structure and the second three-dimensional digital structure. First structural features of the first three-dimensional digital structure are determined using one or more predefined structural criteria. Furthermore, second structural features of the second three-dimensional digital structure are determined using the one or more predefined structural criteria. A first plurality of first feature sets of first structural features is determined. Each of the first feature sets comprises n first structural features of the determined first structural features, wherein the n first structural features are descriptive of a first n-gon and n is a natural number of three or more. A second plurality of second feature sets of second structural features is determined. Each of the second feature sets comprises n second structural features of the determined second structural features, wherein the n second structural features are descriptive of a second n-gon.

Pairs of first and second feature sets are identified, which describe first and second n-gons satisfying a congruence criterion. To each pair of first and second feature set a point in a transformation space is assigned. The assigned point is descriptive for a rigid spatial transformation registering the first n-gon and second n-gon described by the respective pair of first and second feature set. A rigid spatial transformation for registering the first three-dimensional digital structure with the second three-dimensional digital structure is determined using a clustering of the points assigned in the transformation space. The first three-dimensional digital structure and the second three-dimensional digital structure are registered using the determined rigid spatial transformation.

The method may enable an automatic registration of two three-dimensional digital shapes provided in form of the first three-dimensional digital structure and a second three-dimensional digital structure, which represent the same physical object, i.e., the three-dimensional physical structure.

The method may comprise extracting structural features, spanning up a transformation space of potential transformations using the extracted features, clustering the potential transformations, identifying a transformation for the registration using the clustering and applying the identified transformation, in order to register registering the first and second three-dimensional digital structure.

For determining the structural features, e.g., starting with a polygonal mesh, each vertex of the mesh may be assigned with a region of the three-dimensional digital structure. Regions with similar geometric features may be merged, in order to determine coherent regions. Within the resulting merged regions of interest may be determined. For each of the regions of interest a feature point may be determined representing a structural feature of the respective three-dimensional digital structure. Structural features determined for both three-dimensional digital structures, i.e., the first and second structural features may be combined to feature multiplets, i.e., feature sets, each feature set comprising three or more structural features. For example, a number of structural features determined per three-dimensional digital structure may be of the order of a hundred structural features.

Using the determined structural features, for each of the two three-dimensional digital structures, e.g., all feature sets comprising n structural features, e.g., represented by n feature points, may be determined. These feature sets may correspond to all the different n-gons, which can be defined using the structural features, e.g., represented by feature points, determined for the respective three-dimensional digital structure. Defining potential rigid spatial transformations for these n-gons may be significantly simpler than for explicit geometrical structures comprised by the three-dimensional digital structures.

For example, the first and second scan data may result from different scans of the three-dimensional physical structure. The different scans may, e.g., have been executed using different scanning modalities for the respective scan data of three-dimensional physical structure. In case of scan data of a three-dimensional physical dental structure, e.g., the scan data may be scan data of an DICOM head scan and of an optical intraoral jaw scan. The DICOM data may, e.g., comprise X-ray scan data and/or cone-beam computed tomography (CBCT) scan data.

For example, scan data may be acquired using a direct or indirect optical scan, e.g., a direct intraoral scan or an indirect optical scan of a blaster model of a three-dimensional physical dental structure. For example, scan data may be acquired using a CT scan, i.e., a computer tomography scan. A CT scan provides computer-processed combinations of multiple X-ray measurements taken from different angles to produce tomographic, i.e., cross-sectional images. For example, a focal plane tomography may be used with images of multiple planes being taken to generate a composite panoramic image. For example, scan data acquired using cone-beam computed tomography (CBCT), also referred to as digital volume tomography (DVT), may be used. CBCT consisting of X-ray computed tomography with divergent X-rays forming a cone.

The receiving of the first and/or second three-dimensional digital structure may, e.g., comprise an acquiring of the first and/or second scan data using one or more scanners. The one or more scanners used for acquiring the first and/or second scan data may, e.g., be controlled by a computer device executing the method for registering the first three-dimensional digital structure and the second three-dimensional digital structure. Alternatively, the first and/or second scan data may, e.g., be received from one or more external sources. For example, the receiving of the first and/or second three-dimensional digital structure may further comprise generating the first and/or second three-dimensional digital structure using the acquired first and/or second scan data. Alternatively, the first and/or second three-dimensional digital structure may, e.g., be received from one or more external sources. The external sources may, e.g., comprise one or more servers, like one or more cloud server. The external sources may, e.g., comprise one or more removable storage devices configured to communicate with the computer device executing the method for registering the first three-dimensional digital structure and the second three-dimensional digital structure, e.g., wireless or via a wire.

The first and second three-dimensional digital structure may, e.g., be received in arbitrary positions and/or orientations. Thus, the registration may, e.g., start with the first and second three-dimensional digital structure each being arranged in an arbitrary position with an arbitrary orientation.

The first three-dimensional digital structure and the second three-dimensional digital structure may each at least comprise a digital copy of the same section of the three-dimensional physical structure. Thus, the first and second scan data may each comprise at least scan data of the same section of the three-dimensional physical structure. For example, the first three-dimensional digital structure and the second three-dimensional digital structure may be digital copies of the same section of the three-dimensional physical structure, e.g., both three-dimensional digital structure may each represent the complete three-dimensional physical structure or the same section of the three-dimensional physical structure.

For example, one of the two three-dimensional digital structures may represent a first section of the three-dimensional physical structure comprised by a second section of the three-dimensional physical structure represented by the other three-dimensional physical structure.

For example, the first and second three-dimensional digital structure each represents a section of the three-dimensional physical structure, with the two represented sections overlapping each other, i.e., being at least partially identical.

The registration described herein may, e.g., work for two three-dimensional digital structures overlapping only marginally, i.e., the two three-dimensional digital structures may comprise an identical section of the three-dimensional physical structure, which, e.g., is small compared to the size of the two three-dimensional digital structures.

There may be differences in the two three-dimensional digital structures even within representations of the same section of the three-dimensional physical structure, due to the nature of scanning, i.e., the scan modalities, used for acquiring the first and second scan data. In particular, different scan modalities may be used for acquiring the first and second scan data represented by the fist and the second three-dimensional digital structure, respectively.

Examples may, e.g., be resistant to noise, i.e., work reliably also in the present of noise in the acquired scan data represented by the three-dimensional digital structures and thus in the respective three-dimensional digital structures. In case of a scan of a three-dimensional physical structure, there may in general be noise to some degree comprised by the acquired scan data. In case of scan data acquired using by different scan modalities, the type and degree of noise comprised by the different scan data acquired using different scan modalities may differ.

Examples may enable finding distinctive points, i.e., an effective feature extraction, even for shapes representing objects of physiological, e.g., organic nature, e.g., dental objects. Feature extraction of physiological, i.e., organic objects may be challenging, due to an absence of easily distinguishable geometrical features, like sharp edges or corners. Examples may even enable an effective feature extraction in absence of such easily distinguishable geometrical features.

The method may enable a finding of a rigid transformation that aligns the two shapes, i.e., the first and second three-dimensional digital structures with each other. Such a rigid transformation is a geometric transformation of a Euclidean space that preserves the Euclidean distance between every pair of points. A rigid transformation may, e.g., comprise one or more rotations, one or more translations or any sequence of these.

The method comprises a feature extraction in form of the determining of the first and second structural features. Furthermore, a matching is comprised in form of the identifying of the pairs of first and second feature sets, which describe first and second n-gons satisfying a congruence criterion. Finally, a clustering may be used for determining the rigid spatial transformation for registering the first three-dimensional digital structure with the second three-dimensional digital structure. This rigid transformation may then be applied to the three-dimensional digital structure, for which it has been determined, in order to register this the three-dimensional digital structure with the other the three-dimensional digital structure, i.e., transforming the two the three-dimensional digital structure into one common coordinate system.

The feature extraction may enable a finding of several distinctive feature points in each of the two three-dimensional digital structures representing distinctive structural features of the two three-dimensional digital structures.

Examples may, e.g., enable real-time calculations, e.g., comprising a single comparison query for the two three-dimensional digital structures without requiring previous knowledge of any of the two three-dimensional digital structures.

For example, the first structural features are descriptive of surface properties of a first surface of the first three-dimensional digital structure. For example, the first structural features are descriptive of distinctive surface properties of a first surface of the first three-dimensional digital structure.

For example, the second structural features are descriptive of surface properties of a second surface of the second three-dimensional digital structure. For example, the second structural features are descriptive of distinctive surface properties of a second surface of the second three-dimensional digital structure.

For example, the first and the second surface each are represented by a polygon mesh comprising a plurality of vertices and edges. For example, the first and second three-dimensional digital structure may each comprise a polygon mesh comprising a plurality of vertices and edges.

For example, the method further comprises for the first surface merging the vertices to define regions of the mesh of the first surface. Each region comprises one or more of the vertices of the first surface. For example, the method further comprises for the second surface merging the vertices to define regions of the mesh of the second surface. Each region comprises one or more of the vertices of the second surface.

For example, the merging of the vertices for each of the first and the second surface comprises assigning edge values to the edges defining an order for the merging of the vertices along the edges of the mesh of the respective surface according to the assigned edge values.

For example, the edge values of the edges are each descriptive of a degree of alignment of an edge vector extending along the respective edge with a surface normal of a predefined first reference plane. For example, the first reference plane is the occlusal plane defined for the first three-dimensional digital structure. For example, the first reference plane is the occlusal plane defined for the second three-dimensional digital structure.

For example, the edge values of the edges are weighted using inverse mean curvatures assigned to vertices connected by the respective edge.

For example, the merging of the vertices for each of the first and the second surface comprises following the order for the merging defined by the edge values of the respective surface a determining edges connecting regions satisfying one or more predefined merging criteria and for each of the determined edges a merging of the regions connected by the respective edge.

For example, the one or more predefined merging criteria comprise one or more of the following criteria: vertices connected by the respective edge being assigned to different regions, the respective edge connecting regions with mean curvatures of same sign, a delevelling value of the merged region resulting from the merging of the regions connected by the respective edge being equal to or smaller than a predefined first threshold with the delevelling value describing a scalar product of a mean surface normal of the merged region and a distance vector from a lower surface of an axis-aligned bounding box of the merged region to an upper surface of the axis-aligned bounding box of the merged region.

At any point on a surface or surface region, a normal vector may be defined that extends perpendicular to the surface. Planes containing the normal vector are referred to as normal planes. The intersection of a normal plane and the surface forms a curve referred to as a normal section and the curvature of this normal section is referred to as a normal curvature. Different normal sections for a given point on the surface may have different curvatures. As the normal plane is rotated around the normal vector at the given point, such that the normal plane contains the normal vector and the given point, that curvature may vary. The maximum and minimum values of curvatures of these different normal sections are referred the principal curvatures. The mean curvature is the mean, e.g., arithmetic mean, of the two principal curvatures. Alternatively, the mean curvature may be an integral mean curvature taking into account all the curvatures for all the different sections, i.e., for rotating the normal plane around the normal at a given point on the region. The Gaussian curvature is the product of the two principal curvatures.

The merging may, e.g., start with each of the vertices defining its own region, i.e., all the edges connecting vertices extend between different regions. Each region is assigned with certain properties, i.e., descriptor values. Following the order for the merging of the edges, regions may be merged along edges, if they meet the merging criteria. After the merging, the properties, i.e., descriptor values, of the resulting merged region may be updated using the properties, i.e., descriptor values of the regions being merged along the respective edge. The procedure terminates, when all edges have been taken into account following the order for the merging of the edges and there are no edges left, along which a merging may be executable in compliance with the merging criteria.

The edges may, e.g., be sorted and merge requests may be processed following the order for the merging of the edges. Following the order of merging, for each of the edges, the following algorithm may be executed: If an edge connects two vertices from the same region, the edge may not be used for merging and the algorithm continues with the next edge in line following the order for merging. If an edge connects a region with a positive mean curvature with a region with a negative mean curvature, the edge may not be used for merging and the algorithm continues with the next edge in line following the order for merging. If the merged region, which would result from a merging along the edge under consideration, exceeds a predefined delevelling threshold the edge may not be used for merging and the algorithm continues with the next edge in line following the order for merging. Else, the two regions connected by the edge under consideration are merged along the respective edge and the algorithm continues with the next continues with the next edge in line following the order for merging, until the edge queue is empty the process of merging is terminated. The edge queue sorted according to the edge values assigned to the edges.

Thus, regions may, e.g., only be merged along edges, if these edges do not connect two vertices from the same region, do not connect a region with a positive mean curvature with a region with a negative mean curvature and the resulting merged region resulting from a merging does not exceed a predefined delevelling threshold.

For example, the method further comprises for each of the first and the second surface determining regions of interest comprised by the regions resulting from the merging of the respective surface using the one or more predefined structural criteria.

For example, the one or more predefined structural criteria comprise one or more of the following criteria: a predefined second lower threshold for an area of the respective region, a predefined third upper threshold for the area of the respective region, a predefined fourth lower threshold for a ratio of an integral mean curvature and the area of the respective region, a predefined fifth upper threshold for the ratio of the integral mean curvature and the area of the respective region, a predefined sixth lower threshold for an angle between a surface normal of the respective region and a surface normal of a predefined second reference plane, a predefined seventh upper threshold for the angle between the surface normal of the respective region and the surface normal of the predefined second reference plane.

Exemplary values for the predefined structural criteria used in case the three-dimensional physical structure is a three-dimensional physical dental structure may, e.g., comprise one or more of the following: an area of the respective region in a range from 5 $mm^2$ to 60 $mm^2$, i.e., a predefined second lower threshold of 5 $mm^2$ and a predefined third upper threshold of 60 $mm^2$; an absolute value of a ratio of an integral mean curvature and the area of the respective region in a range from 0.15 to 0.8, e.g., for a negative curvature only, i.e., a predefined fourth lower of 0.15 and a predefined fifth upper threshold of 0.8; an angle between a surface normal of the respective region and a surface normal of a predefined second reference plane in a range from −45° to 45°, i.e., a predefined sixth lower threshold of −45° and a predefined seventh upper threshold of 45°.

For example, the predefined second reference plane is identical with the predefined first reference plane. For example, the second reference plane is the occlusal plane defined for the first and second three-dimensional digital structure occlusal plane.

For example, the regions of interest are one or more of the following: cusps, incisal edges, fissures.

Once the merging of the regions has been finished, regions of interest comprised by the merged regions may be determined. For example, two types of regions of interest may be determined: cusps and valleys. Regions of interest with positive curvatures may represent valleys. Regions of interest with negative curvatures may represent cusps. In case the three-dimensional physical structure is a three-dimensional physical dental structure, e.g., cusps or incisal edges and fissures may be determined as the relevant two types of regions of interest. Regions of interest with positive curvatures may, e.g., represent fissures. Regions of interest with negative curvatures may, e.g., represent cusps or incisal edges.

Regions of interest may, e.g., be filtered out using selection thresholds for the properties, i.e., descriptor values, of the merged regions. For example, the one or more predefined structural criteria defined above may be used as selections threshold for the filtering.

For example, the first structural features are comprised by the regions of interest of the first surface. For example, the second structural features are comprised by the regions of interest of the second surface.

For example, the determined regions of interest may each be reduced to single points, i.e., a single vertex comprised by the respective region of interest. These identified vertices resulting from the reduction or the regions of interest may, e.g., be used as the structural features of the individual regions of interest and thus as the structural features of the first and second three-dimensional digital structure, respectively. For example, each of the regions of interest may be reduced to an extremum, i.e., a minimum in case of a valley with a positive curvature and a maximum in case of cusp with a negative curvature.

For example, the first and second structural features each are represented by feature points of the regions of interest comprising the respective structural feature. The feature points of the regions of interest are each provided by an extremum within the respective region of interest.

The extrema within the first and second regions of interest may, e.g., be highest points, i.e., maxima, in case of cusps or incisal edges. The extrema within the first and second regions of interest may, e.g., be lowest points, i.e., minima, in case of fissures.

Embodiments may enable a finding of structural features in form of distinctive points, i.e., vertices, in each of the first and second three-dimensional digital structures. By finding distinctive feature points, it may be managed to reduce the number of vertices per mesh to be taken into account for a matching from, e.g., up to one million vertices per mesh, down to a couple of features, e.g., to the order of a hundred or less vertices. This features extraction providing first structural features in form of individual vertices of regions of interest of the first three-dimensional digital structure and second structural features in form of individual vertices of regions of interest of the second three-dimensional digital structure, may thus be achieved using a region merging method and region of interest identification method based on a couple of low-dimensional descriptors.

For example, the first and second n-gons are one of the following: planar n-gons, non-planar n-gons.

For example, the number n of first structural features per first feature set and of second structural features per second feature set is n equals three, i.e., n=3.

For example, the method comprises selecting the first and second n-gons for the pairing using a predefined pairing criterion.

Examples may have the advantages that an iterative correspondence search may be avoided. Thus, neither an exhaustive search, nor expensive fit error calculations are required. Examples may rather employ a streamlined majority voting method. This may provide robust results, even when noise is present.

The n-gons, i.e., feature multiplets from each three-dimensional digital structure may be combined to create unique pairs of n-gons, i.e., feature multiplets. For example, a list of all the n-gons that could be correspondent is generated. Thus, the matching of the two three-dimensional digital structures is focused on possible matches of the n-gons, which are comparable simple geometric forms, rather than the three-dimensional digital structures, which may by far be more complex geometric forms.

For example, the predefined pairing criterion for selecting the first and second n-gons requires an area of the respective n-gons to exceed a predefined minimum area.

By using a predefined minimum area as a pairing criterion for selecting numerical instabilities may be avoided. For example, only such triangles may be used for pairing, for which it is plausible, that they may be present in both three-dimensional digital structures.

For example, the first and second n-gons are paired as pairs of n-gons having a degree of congruence exceeding a predefined minimum degree of congruence.

For example, rigid boundary conditions may be used and only approximately congruent n-gons, i.e., n-gons satisfying a having a degree of congruence exceeding a predefined minimum degree of congruence may be considered for pairing. Two sets of points, e.g., two n-gons, are called congruent if, and only if, one can be transformed into the other by an isometry, i.e., a combination of rigid motions. For example, the predefined minimum degree of congruence being 90% of congruence, i.e., deviation of 10% or less between two n-gons may be accepted for the pairing. For example, the predefined minimum degree of congruence being 95% of congruence, i.e., deviation of 5% or less between two n-gons may be accepted for the pairing. For example, the predefined minimum degree of congruence being 96% of congruence, i.e., deviation of 4% or less between two n-gons may be accepted for the pairing. For example, the predefined minimum degree of congruence being 97% of congruence, i.e., deviation of 3% or less between two n-gons may be accepted for the pairing. For example, the predefined minimum degree of congruence being 98% of congruence, i.e., deviation of 2% or less between two n-gons may be accepted for the pairing. For example, the predefined minimum degree of congruence being 99% of congruence, i.e., deviations of 1% or less between two n-gons may be accepted for the pairing.

For example, the pairs are weighted using weights, which are proportional to the degree of congruence. For example, one or more of the following may be used for weighting: a combination of distances between first corners of the first n-gon and second corners of the second n-gon, an inverse of a mean area of the first and second n-gon, angles between surface normals assigned to the first and second feature points describing the first and second n-gon.

For each pair of n-gons, there exists an explicit rigid transformation, which registers the two n-gons with each other. The combination of distances, e.g., a sum of the distances, between the first corners, i.e., the corner of the first n-gon and the second corners, i.e., the corner of the second n-gon, after the respective explicit rigid transformation has been applied, may quantify how well the two n-gons match after the transformation. In particular, deviations of the positions may, e.g., be quantified. In case, the corners of the n-gons match perfectly after the transformation, the value of the combination of distances may, e.g., be zero.

Angles between surface normals assigned to the first and second feature points describing the first and second n-gon may, e.g., be used to quantify deviations of orientations. Using dedicated parameters, the weighting of the distances, i.e., deviations of positions, and the deviations of the surface normal, i.e., deviations of orientations, may be weighted.

The pairing may, e.g., result in 500 000 to 1 000 000 pairs of n-gons. Each of these pairs may be equivalent to a transformation, i.e., 500 000 to 1 000 000 transformations, originating from unique n-gons.

For example, the transformation space is a k-dimensional transformation space. For example, k is unequal n. For example, k=3·n.

The k-dimensional transformation space is a multi-dimensional space, e.g., nine-dimensional space (k=9) featuring scattered points, each of which represents a single three-dimensional rigid transformation for an n-gon with n=3.

In case of triangles, i.e., 3-gons, with three three-dimensional points, a rigid transformation of one triangle into another triangle may be described by nine values resulting from three three-dimensional transformation vectors for the three three-dimensional points of a triangle. Thus, the respective transformation may be described as a point in a nine-dimensional transformation space.

For example, the method further comprises a clustering of the points in the transformation space.

For example, a plurality of k/3 fixed three-dimensional points, e.g., three fixed three-dimensional points for k=9, in space may be chosen. For example, three corners of a bounding box may be chosen. These chosen three-dimensional points may define an origin of the k-dimensional transformation space. The transformation may be defined as a point in the k-dimensional space by applying a transformation to the origin, e.g., three fixed three-dimensional points for k=9. The resulting transformed three-dimensional points, e.g., three transformed three-dimensional points for k=9, may be interpreted as a new k-dimensional point in the k-dimensional transformation space. The k-dimensional point is defined by k components, i.e., k/3 times 3 components of the k/3 three-dimensional points. Such a parametrization may, e.g., be easier to handle compared with using angles and translation.

Each point in transformation space represents a transformation between a unique pair of n-gons. The pairs of n-gons each comprise features of both three-dimensional digital structures and thus define a transformation between these features.

A cluster in the transformation space represents a significant number of unique pairs of n-gons, being related by the same transformation or at least by similar transformations. Thus, a cluster may be seen as a result representing a transformation, which works for a majority of the pairs of n-gons. It may be interpreted as a transformation, for which a majority of pairs of n-gons has voted. On the other hand, results which are induced only by a few pairs of n-gons, may be represented as scattered points, i.e., noise in the transformation space.

Therefore, one of the clusters in transformation space may be selected as representing a suitable transformation to be used for registering the first and second three-dimensional digital structure. By identifying clusters in the transformation space potential results for the searched transformation may be found.

The clustering may, e.g., comprise using an expectation-maximization algorithm, a k-means algorithm, a nearest neighbors algorithm or a spectral clustering algorithm.

An expectation-maximization (EM) algorithm is an iterative method for finding local (maximum likelihood or) maximum a posteriori (MAP) estimates of parameters in statistical models, where the model depends on unobserved latent variables. The EM iteration alternates between performing an expectation step, i.e., E step, which creates a function for the expectation of the log-likelihood evaluated using the current estimate for the parameters, and a maximization step, i.e., M-step, which computes parameters maximizing the expected log-likelihood found on the E step. These parameter-estimates are then used to determine the distribution of the latent variables in the next E step.

A k-means algorithm for clustering refers a method of vector quantization, that aims to partition n observations into k clusters in which each observation belongs to the cluster with the nearest mean. This results in a partitioning of the data space into Voronoi cells.

The nearest neighbors algorithm, also referred to as k-nearest neighbors algorithm, is a non-parametric, supervised learning classifier, which uses proximity to make classifications or predictions about the grouping of an individual data point. While it can be used for either regression or classification problems, it is typically used as a classification algorithm, working off the assumption that similar points can be found near one another.

A spectral clustering algorithm makes use of a spectrum (eigenvalues) of a similarity matrix of data to perform dimensionality reduction before clustering in fewer dimensions. The similarity matrix is provided as an input and consists of a quantitative assessment of the relative similarity of each pair of points in the dataset.

For example, the method further comprises identifying a plurality of clusters as a result of the clustering with each cluster representing a rigid spatial transformation. One of the clusters is selected for determining the rigid spatial transformation for registering the first three-dimensional digital structure with the second three-dimensional digital structure.

For example, the method further comprises determining the rigid spatial transformations represented by the identified clusters. The determining of the rigid spatial transformations comprises determining points of the identified clusters. Each of the determined points is a point in the transformation space representing a specific rigid spatial transformation.

For example, the determining of the rigid spatial transformations comprises determining means of the identified clusters. Each of the determined means is a point in the transformation space representing a specific rigid spatial transformation. Each mean is a point in transformation space and may define a transformation represented by the respective cluster.

For example, the method further comprises calculating a surface fit error for one or more of the rigid spatial transformations represented by the determined points of the identified clusters. Calculating a surface fit error may be rather computationally intensive and time consuming. By calculating a surface fit error only for a few rigid spatial transformations at the end of the method, but not repeatedly in an iterative fashion, may significantly reduce the computational effort and required time.

For example, the method further comprises calculating a surface fit error for one or more of the rigid spatial transformations represented by the determined means of the identified clusters.

The surface fit error may, e.g., take into account a combination of distances between vertices, e.g., structural features, of one of the two three-dimensional digital structures to be transformed after the transformation and nearest vertices, e.g., structural features, of the other three-dimensional digital structure. The surface fit error may, e.g., take into account a combination of angles between surface normals at the vertices, e.g., structural features, of the three-dimensional digital structure to be transformed after the transformation and surface normals at the nearest vertices, e.g., structural features, of the other three-dimensional digital structure.

Furthermore, adjustment parameters may be used, which enable an adjusting of a weighting of the angles between the surface normal, descriptive of deviations of orientations resulting from the respective transformation, and the distances between the vertices, descriptive of deviations of positions resulting from the respective transformation.

For example, the method further comprises selecting from the rigid spatial transformations represented by the identified clusters a rigid spatial transformation with a smallest surface fit error as the rigid spatial transformation for registering the first three-dimensional digital structure with the second three-dimensional digital structure.

Example may enable an automatic selection of a rigid spatial transformation to be used for registering the first three-dimensional digital structure with the second three-dimensional digital structure.

For example, the first three-dimensional digital structure is a first three-dimensional digital dental structure representing first scan data of a three-dimensional physical dental structure. For example, the second three-dimensional digital structure is a second three-dimensional digital dental structure representing second scan data of a three-dimensional physical dental structure.

For example, the method further comprises generating a three-dimensional digital dental restoration model defining a form of the dental restoration element to be used for restoring one or more of the teeth of the first and/or second three-dimensional digital dental structure. For generating the three-dimensional digital dental restoration model, e.g., the registered first and second three-dimensional digital structure may be used.

The three-dimensional digital restoration model may, e.g., define a form of a dental restoration element to be provided for restoring one or more of the teeth of the first and/or second three-dimensional digital dental structure. For receiving the dental restoration element defined by the respective three-dimensional digital restoration model, the respective tooth may have to be prepared. The three-dimensional digital restoration model may be constructed such that it complies with restrictions, in particular geometric restrictions, defined by the first and second three-dimensional digital dental structure. The three-dimensional digital restoration model may, e.g., be generated by a computer system executing the method for registering the first three-dimensional digital structure and the second three-dimensional digital structure.

For generating the three-dimensional digital restoration model, e.g., a three-dimensional digital library tooth model from a digital tooth library may be used. For example, the three-dimensional digital library tooth model may in addition be adjusted to the dentition of the patient. For example, a three-dimensional digital tooth model of another tooth of the patient's dentition, e.g., an opposite tooth within the same dental arch or an antagonist, may be used for generating the three-dimensional digital restoration model. For example, the three-dimensional digital tooth model of the other tooth may in addition be adjusted to the dentition of the patient. For example, the three-dimensional digital restoration model may be generated from scratch.

For example, the method further comprises controlling a manufacturing device for manufacturing the dental restoration element in form of a physical copy of the three-dimensional digital dental restoration model.

For manufacturing the dental restoration element, e.g., computer-controlled additive and/or subtractive methods may be used. For example, the dental restoration element may be manufactured using one of the following: machining, 3D printing, casting.

Examples may have the beneficial effect, that the dental restoration element may be manufactured using a machining device configured to manufacture the dental restoration element by processing a blank of restoration material. For example, the dental restoration element may be manufactured using a 3D printing device, i.e., a printer, configured to print the dental restoration element.

For example, the dental restoration element is one of the following: a veneer, a coping with coating, an inlay, an onlay, an overlay, a crown, a bridge, a mockup, a waxup, a provisional.

A veneer is a layer of restoration material placed over a tooth, in order to cover one or more surfaces of the tooth. Veneers may, e.g., improve the aesthetics of a smile and/or protect the tooth's surface from damage. Indirect veneers are manufactured outside of a patient's oral cavity and then arranged on a tooth within the oral cavity. Direct veneers are built-up directly on a tooth inside a patient's oral cavity. The tooth may be prepared for receiving the veneer.

For example, two main types of restoration material may be used for manufacturing a veneer: composite and dental porcelain. A composite veneer may be directly placed on the tooth, i.e., built-up in the mouth of patient, or indirectly manufactured outside the mouth of the patient and later bonded to the tooth. In contrast, a porcelain veneer may only be indirectly manufactured outside the mouth of the patient. A full veneer crown, on the one hand, is dental restoration element that is configured to cover all the coronal tooth surfaces, i.e., the mesial, distal, facial, lingual and occlusal surfaces. A laminate veneer, on the other hand, is a thin layer of restoration material that may, e.g., cover only a single surface of a tooth, e.g., a labial surface. A laminate veneer may generally be used for aesthetic purposes.

Coping with coating refers to a dental restoration element, which is directly built on the tooth to be restored. An underlying coping is arranged on the tooth. The coping is configured to replicate the performance of a natural tooth. On the coping a coating is applied, which is configured to replicate the natural aesthetics of the tooth to be restored. For example, a ceramic coating may be used. Using a coping with coating to restore a tooth may have the beneficial effect of providing a dental restoration element that combines both durability and natural aesthetics.

Inlays, onlays, and overlays are forms of indirect restoration manufactured outside of a patient's oral cavity as a single, solid piece that fits a specific size and shape of a reception prepared within a tooth of the oral cavity. The inlay, onlay, or overlay is arranged within the respective reception and bonded, e.g., cemented, in place on the prepared tooth. In contrary to a crown, inlays, onlays, and overlays are arranged within a reception prepared within a damaged tooth.

An inlay is configured to cover an inner, e.g., central, section of an occlusal surface of a tooth. Thus, an inlay may be used to replace an internal part of a damaged tooth and cover part of the occlusal surface of the respective tooth. The inlay is positioned within hard tissues of the tooth, but does not cover a cusp or pointed part of the tooth. In comparison to an inlay, an onlay in addition covers at least one of the cusps of the tooth. In comparison to an onlay, an overlay covers a larger portion of the occlusal surface of the tooth extending beyond the cusps.

The inlays, onlays, and overlays may, e.g., be configured as pinlays. Pinlays are characterized by an additional use of pins to increase their retention. Thus, any inlay, onlay, or overlay may be configured as a pinlay by being braced by pins. Such a pin may, e.g., be inserted at an edge of the tooth or parallel to a groove. In general, the base of a pin is selected to lie in a section of the tooth surface that is free of damage.

A crown is a dental restoration element in form of a dental cap. Such a crown may, e.g., be provided in form of a full coverage crown or a partial crown, like a ⅞ crown or a ¾ crown. Partial crowns, like ⅞ and ¾ crowns, are hybrids between an onlay and a full coverage crown. They are categorized based on an estimated degree of wall coverage of the walls of the prepared tooth, on which the respective crown is arranged. For example, a ¾ crown aims to cover three thirds of the walls of the tooth to be restored, e.g., three out of the four walls, e.g., with the buccal wall being spared. For example, a ⅞ crown aims to cover seven eights of the walls of the tooth to be restored. A full coverage crown completely caps or encircles a prepared tooth. A crown may, e.g., be required when a large cavity threatens the health of a tooth. A crown may be bonded to the tooth prepared for receiving the crown using a bonding material, e.g., a dental cement. A crown may be made from various materials, which may be fabricated using indirect methods, i.e., outside the patient's oral cavity. Crowns may be used to improve strength, to improve appearance of teeth and/or to halt deterioration.

A bridge is a dental restoration element in form of a permanent appliance used to replace one or more missing teeth. A dental bridge comprises a plurality of artificial dental elements that are fused together, e.g., one or more artificial replacement teeth are definitively joined to adjacent teeth. A conventional bridge may be supported, e.g., by full coverage crowns, partial crowns, overlays, onlays or inlays on the abutment teeth. The abutment teeth require preparation and reduction to support the bridge.

A mockup prosthetic restoration composite is a composite to be arranged within a patient's mouth in order to visualize for the patient a result of a prosthetic restoration, before the actual prosthetic restoration is executed. Thus, the patient as well as a dentist may asses the expected esthetic and functional outcome of the prosthetic restoration. The final result to be expected may thus be visualized at an early stage of planning a prosthetic restoration. This approach may ensure that the patient as well as the dentist may the same result to be achieved in mind and allows for potential adjustments to be made prior to the final restorations manufactured and applied, e.g., cemented.

A waxup prosthetic restoration refers to a prosthetic restoration made from laboratory wax. Such a waxup prosthetic restoration is used for acquiring information indicative of whether a specific prosthetic restoration is appropriate. A planned prosthetic restoration may be generated using from laboratory wax. The waxup prosthetic restoration may be used to test, whether the planned prosthetic restoration is appropriate. Using wax may have the beneficial effect, that the waxup prosthetic restoration may be easily adjusted to also test adjustments of the planned prosthetic restoration and/or adjusting the planned prosthetic restoration to requirements determined using the waxup prosthetic restoration.

A waxup model may, e.g., be used by a doctor and/or a practitioner for visualization purposes. Furthermore, it may, e.g., also be used for generating one or more in-mouth preparation guiding surfaces, e.g., using silicon imprints, where the doctor and/or practitioner may measure and/or visually gauge, whether a planned tooth reduction has been performed.

A provisional is a type of interim dental restoration designed to be a template for the final restoration. It is used to verify, e.g., a comfort in occlusion for the patient, esthetic parameters that satisfy the patient's and dentist's expected goals and/or phonetic evaluation for speech and airflow. Esthetic parameters ma, e.g., comprise shape, midlines, smile line, embrasure shapes, and/or position of contacts. The phonetic evaluation for speech and airflow may ensure that no sibilance, whistlers, and/or lisp occur and a clear articulation being enabled by the prosthetic restoration resembled by the provisional.

In another aspect a computer program product is disclosed for registering a first three-dimensional digital structure and a second three-dimensional digital structure. The first three-dimensional digital structure represents first scan data of a three-dimensional physical structure. The second three-dimensional digital structure represents second scan data of the three-dimensional physical structure.

The computer program product comprises a computer readable storage medium having program instructions embodied therewith. The program instructions are executable by a processor of a computer device to cause the computer device to receive the first three-dimensional digital structure and the second three-dimensional digital structure. First structural features of the first three-dimensional digital structure are determined using one or more predefined structural criteria. Furthermore, second structural features of the second three-dimensional digital structure are determined using the one or more predefined structural criteria. A first plurality of first feature sets of first structural features is determined. Each of the first feature sets comprises n first structural features of the determined first structural features, wherein the n first structural features are descriptive of a first n-gon and n is a natural number of three or more. A second plurality of second feature sets of second structural features is determined. Each of the second feature sets comprises n second structural features of the determined second structural features, wherein the n second structural features are descriptive of a second n-gon.

Pairs of first and second feature sets are identified, which describe first and second n-gons satisfying a congruence criterion. To each pair of first and second feature set a point in a transformation space is assigned. The assigned point is descriptive for a rigid spatial transformation registering the first n-gon and second n-gon described by the respective pair of first and second feature set. A rigid spatial transformation for registering the first three-dimensional digital structure with the second three-dimensional digital structure is determined using a clustering of the points assigned in the transformation space. The first three-dimensional digital structure and the second three-dimensional digital structure are registered using the determined rigid spatial transformation.

The program instructions provided by the computer program product may further be executable by the processor of the computer device to cause the computer device to execute any of the aforementioned examples of the computer-implemented method for registering a first three-dimensional digital structure and a second three-dimensional digital structure.

In another aspect a computer program is disclosed for registering a first three-dimensional digital structure and a second three-dimensional digital structure. The first three-dimensional digital structure represents first scan data of a three-dimensional physical structure. The second three-dimensional digital structure represents second scan data of the three-dimensional physical structure.

The computer program comprises program instructions. The program instructions are executable by a processor of a computer device to cause the computer device to receive the first three-dimensional digital structure and the second three-dimensional digital structure. First structural features of the first three-dimensional digital structure are determined using one or more predefined structural criteria. Furthermore, second structural features of the second three-dimensional digital structure are determined using the one or more predefined structural criteria. A first plurality of first feature sets of first structural features is determined. Each of the first feature sets comprises n first structural features of the determined first structural features, wherein the n first structural features are descriptive of a first n-gon and n is a natural number of three or more. A second plurality of second feature sets of second structural features is determined. Each of the second feature sets comprises n second structural features of the determined second structural features, wherein the n second structural features are descriptive of a second n-gon.

Pairs of first and second feature sets are identified, which describe first and second n-gons satisfying a congruence criterion. To each pair of first and second feature set a point in a transformation space is assigned. The assigned point is descriptive for a rigid spatial transformation registering the first n-gon and second n-gon described by the respective pair of first and second feature set. A rigid spatial transformation for registering the first three-dimensional digital structure with the second three-dimensional digital structure is determined using a clustering of the points assigned in the transformation space. The first three-dimensional digital structure and the second three-dimensional digital structure are registered using the determined rigid spatial transformation.

The program instructions provided by the computer program may further be executable by the processor of the computer device to cause the computer device to execute any of the aforementioned examples of the computer-implemented method for registering a first three-dimensional digital structure and a second three-dimensional digital structure.

In another aspect a computer device is disclosed for registering a first three-dimensional digital structure and a second three-dimensional digital structure. The first three-dimensional digital structure represents first scan data of a three-dimensional physical structure. The second three-dimensional digital structure represents second scan data of the three-dimensional physical structure.

The computer device comprises a processor and a memory storing program instructions executable by the processor. Execution of the program instructions by the processor causes the computer device to receive the first three-dimensional digital structure and the second three-dimensional digital structure. First structural features of the first three-dimensional digital structure are determined using one or more predefined structural criteria. Furthermore, second structural features of the second three-dimensional digital structure are determined using the one or more predefined structural criteria. A first plurality of first feature sets of first structural features is determined. Each of the first feature sets comprises n first structural features of the determined first structural features, wherein the n first structural features are descriptive of a first n-gon and n is a natural number of three or more. A second plurality of second feature sets of second structural features is determined. Each of the second feature sets comprises n second structural features of the determined second structural features, wherein the n second structural features are descriptive of a second n-gon.

Pairs of first and second feature sets are identified, which describe first and second n-gons satisfying a congruence criterion. To each pair of first and second feature set a point in a transformation space is assigned. The assigned point is descriptive for a rigid spatial transformation registering the first n-gon and second n-gon described by the respective pair of first and second feature set. A rigid spatial transformation for registering the first three-dimensional digital structure with the second three-dimensional digital structure is determined using a clustering of the points assigned in the transformation space. The first three-dimensional digital structure and the second three-dimensional digital structure are registered using the determined rigid spatial transformation.

Execution of the program instructions stored in the memory by the processor may further cause the computer device to execute any of the aforementioned examples of the computer-implemented method for registering a first three-dimensional digital structure and a second three-dimensional digital structure.

The computer device may, e.g., further be configured controlling one or more manufacturing device for manufacturing one or more dental restoration elements configured using the registered first and second three-dimensional digital structure.

It is understood that one or more of the aforementioned embodiments may be combined as long as the combined embodiments are not mutually exclusive.

BRIEF DESCRIPTION OF THE DRAWINGS

In the following, examples are described in greater detail making reference to the drawings in which.

DETAILED DESCRIPTION

Figure 1:
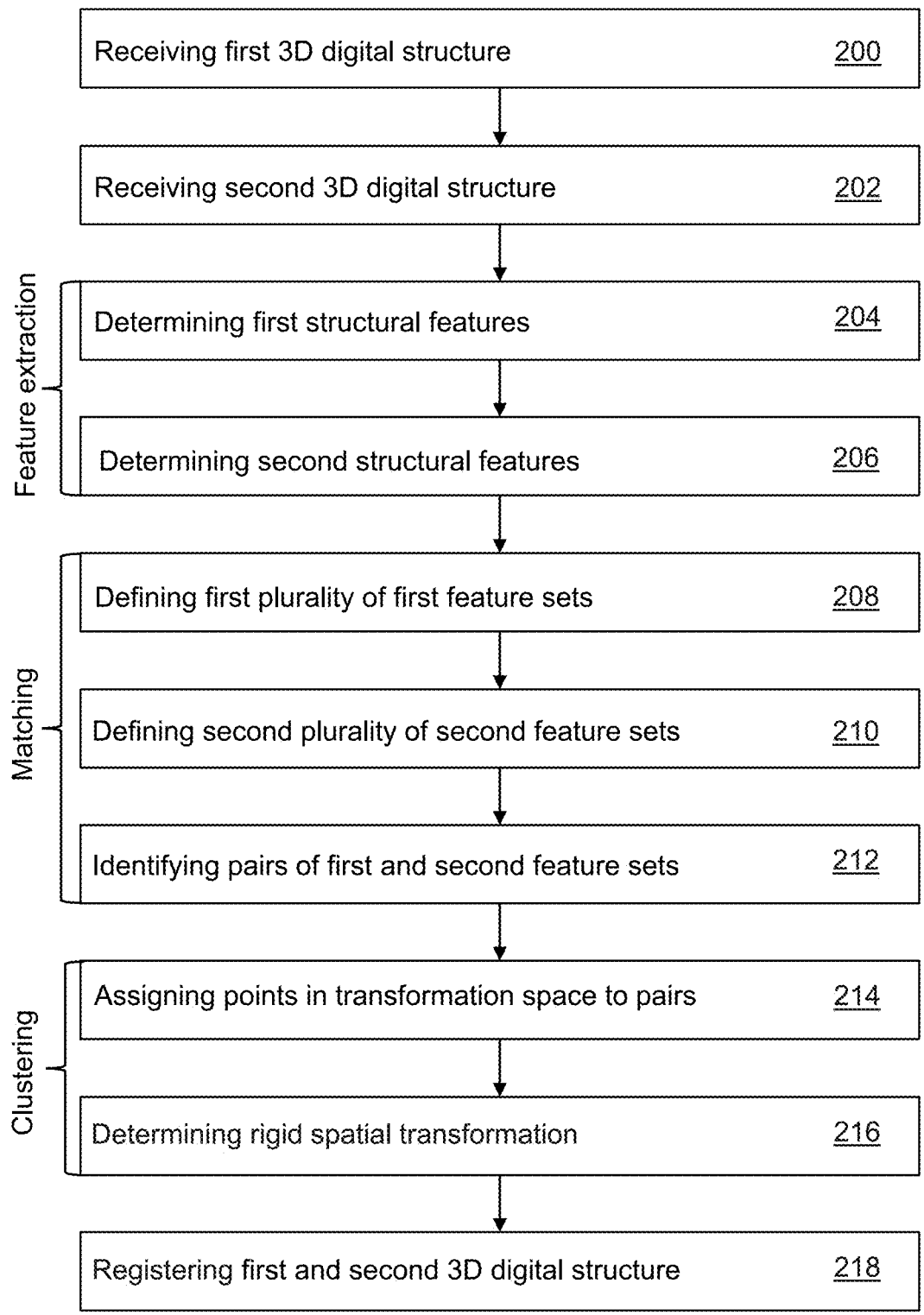
FIG. 1 shows a flowchart illustrating an exemplary method for registering a first three-dimensional digital structure and a second three-dimensional digital structure.

In the following, similar elements are denoted by the same reference numerals.

FIG. 1 shows an exemplary method for registering a first three-dimensional digital structure and a second three-dimensional digital structure. In block 200, the first three-dimensional digital structure is received. The first three-dimensional digital structure represents first scan data of a three-dimensional physical structure. For example, the first three-dimensional digital structure may be a first three-dimensional digital dental structure representing first scan data of a three-dimensional physical dental structure. In block 202, the second three-dimensional digital structure is received. The second three-dimensional digital structure represents second scan data of the three-dimensional physical structure. For example, the second three-dimensional digital structure may be a second three-dimensional digital dental structure representing second scan data of a three-dimensional physical dental structure.

In block 204, structural features of the first three-dimensional digital structure are determined using one or more predefined structural criteria. In block 206, second structural features of the second three-dimensional digital structure are determined using the one or more predefined structural criteria. In block 208, a first plurality of first feature sets of first structural features is determined. Each of the first feature sets comprises n first structural features of the determined first structural features, wherein the n first structural features are descriptive of a first n-gon and n is a natural number of three or more. In block 210, a second plurality of second feature sets of second structural features is determined. Each of the second feature sets comprises n second structural features of the determined second structural features, wherein the n second structural features are descriptive of a second n-gon.

In block 212, pairs of first and second feature sets are identified, which describe first and second n-gons satisfying a congruence criterion. In block 214, a point in a transformation space is assigned to each pair of first and second feature set. The assigned point is descriptive for a rigid spatial transformation registering the first n-gon and second n-gon described by the respective pair of first and second feature set. In block 216, a rigid spatial transformation for registering the first three-dimensional digital structure with the second three-dimensional digital structure is determined using a clustering of the points assigned in the transformation space. In block 218, the first three-dimensional digital structure and the second three-dimensional digital structure are registered using the determined rigid spatial transformation.

Figure 2:
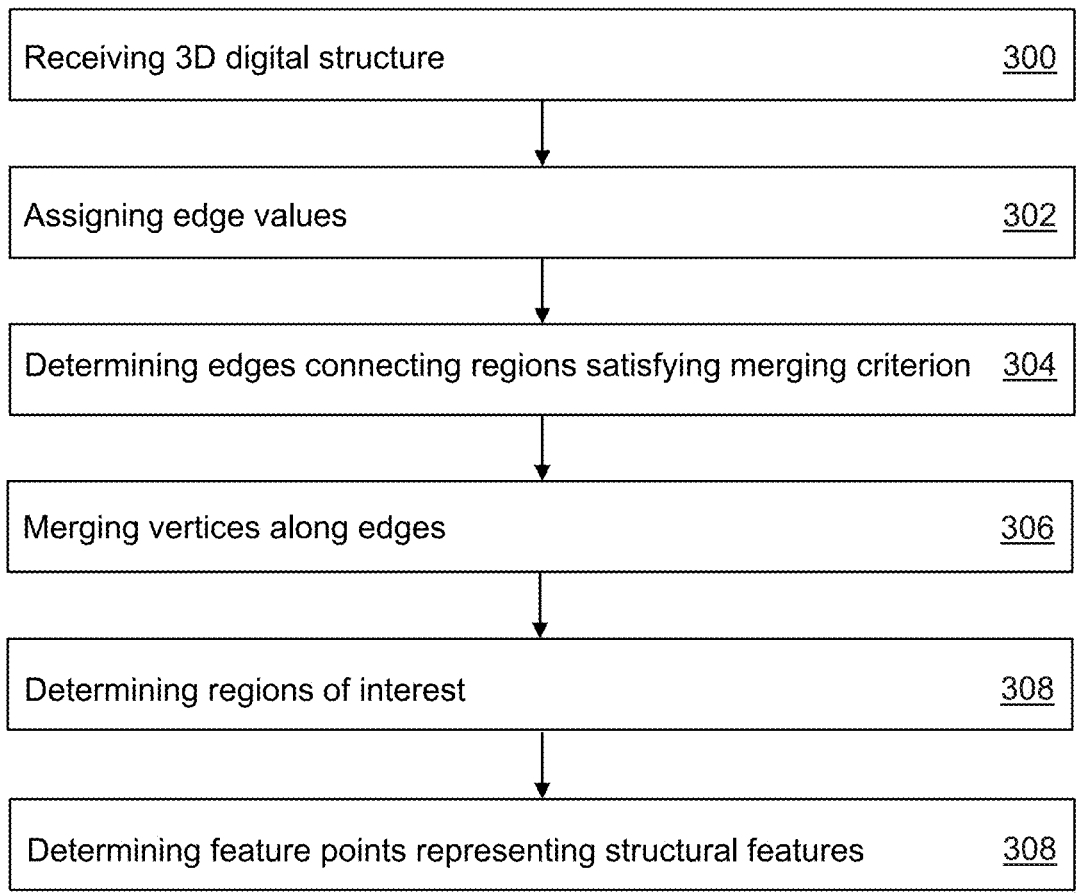
FIG. 2 shows a flowchart illustrating an exemplary method for determining structural features of first and second three-dimensional digital structures.

FIG. 2 shows an exemplary method for feature extraction form a three-dimensional digital structure. The three-dimensional digital structure may, e.g., be the first or second three-dimensional digital structure of FIG. 1 In block 300, the three-dimensional digital structure is received. The three-dimensional digital structure comprises a surface represented by a polygon mesh comprising a plurality of vertices and edges.

In block 302, edge values are assigned to the edges of the polygon mesh defining an order for a merging of the vertices of the mesh along the edges of the mesh of the surface according to the assigned edge values. For example, the edge values of the edges are each descriptive of a degree of alignment of an edge vector extending along the respective edge with a surface normal of a predefined first reference plane. For example, the first reference plane is an occlusal plane defined for the three-dimensional digital structure, in case the three-dimensional digital structure is a three-dimensional digital dental structure representing scan data of a three-dimensional physical dental structure. For example, the edge values of the edges are weighted using inverse mean curvatures assigned to vertices connected by the respective edge.

In block 304, following the order for the merging defined by the edge values of the respective surface edges connecting regions satisfying one or more predefined merging criteria are determined and, in block 306, for the determined edges a merging of the regions connected by the respective edge is executed. For example, the one or more predefined merging criteria comprise one or more of the following criteria: vertices connected by the respective edge being assigned to different regions, the respective edge connecting regions with mean curvatures of same sign, a delevelling value of the merged region resulting from the merging of the regions connected by the respective edge being equal to or smaller than a predefined first threshold with the delevelling value describing a scalar product of a mean surface normal of the merged region and a distance vector from a lower surface of an axis-aligned bounding box of the merged region to an upper surface of the axis-aligned bounding box of the merged region.

In block 308, regions of interest are determined for the surface comprised by the regions resulting from the merging of the surface using one or more predefined structural criteria. For example, the one or more predefined structural criteria comprise one or more of the following criteria: a predefined second lower threshold for an area of the respective region, a predefined third upper threshold for the area of the respective region, a predefined fourth lower threshold for a ratio of an integral mean curvature and the area of the respective region, a predefined fifth upper threshold for the ratio of the integral mean curvature and the area of the respective region, a predefined sixth lower threshold for an angle between a surface normal of the respective region and a surface normal of a predefined second reference plane, a predefined seventh upper threshold for the angle between the surface normal of the respective region and the surface normal of the predefined second reference plane. For example, the predefined second reference plane may be identical with the predefined first reference plane.

In case the three-dimensional digital structure is a three-dimensional digital dental structure, the regions of interest may, e.g., be one or more of the following: cusps, incisal edges, fissures. For example, the structural features determined in blocks 204 or 206 of FIG. 1 are comprised by the regions of interest of the surface. In block 310, for each of the regions of interest determined in block 308, a feature point is determined representing the structural feature comprised by the respective region of interest. The feature points of the regions of interest, e.g., are each provided by an extremum within the respective region of interest. In case the three-dimensional digital structure is a three-dimensional digital dental structure, the extrema within the first and second regions of interest may, e.g., be highest points, i.e., maxima, in case of cusps or incisal edges. The extrema within the first and second regions of interest may, e.g., be lowest points, i.e., minima, in case of fissures.

Figure 3:
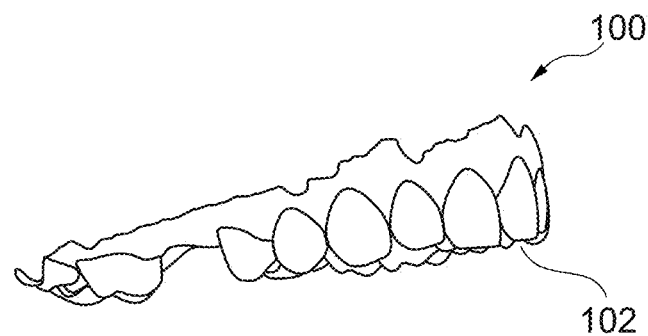
FIG. 3 shows an exemplary first three-dimensional digital structure.

FIG. 3 shows an exemplary first three-dimensional digital structure 100. The first three-dimensional digital structure 100 shown in FIG. 3 is a three-dimensional digital dental structure representing scan data of a three-dimensional physical dental structure. As a three-dimensional digital dental structure, the three-dimensional digital structure 100, e.g., comprises teeth 102.

Figure 4:
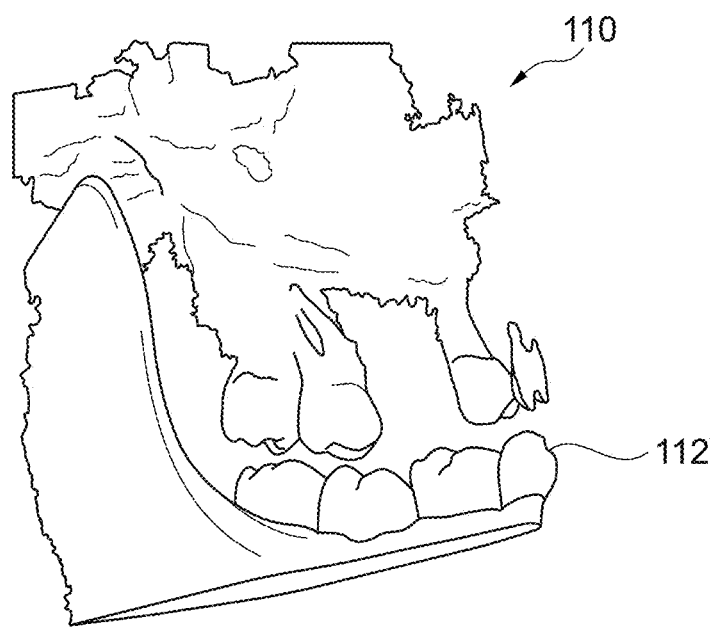
FIG. 4 shows an exemplary second three-dimensional digital structure.
Figure 5:
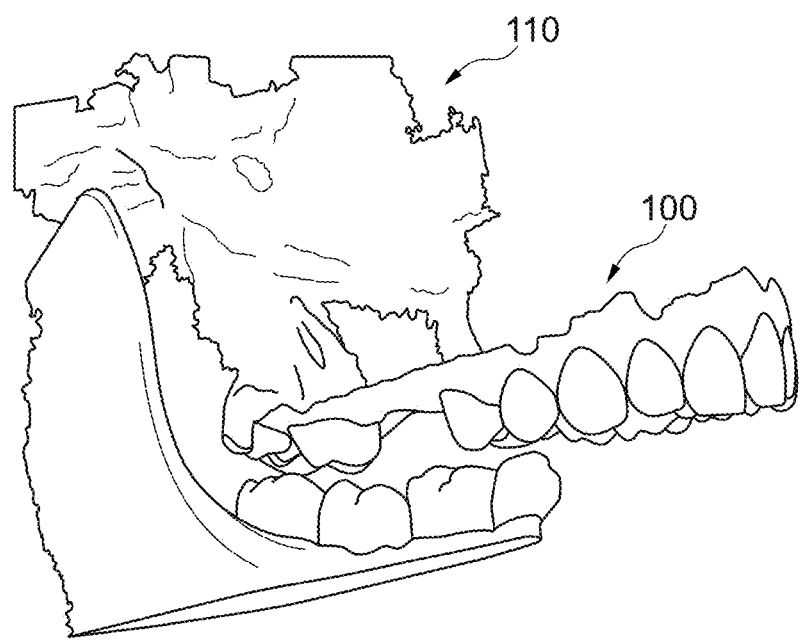
FIG. 5 shows an exemplary registration of the first three-dimensional digital structure of FIG. 3 with the second three-dimensional digital structure of FIG. 4.

FIG. 4 shows an exemplary second three-dimensional digital structure 110. The second three-dimensional digital structure 110 shown in FIG. 4 is a three-dimensional digital dental structure representing scan data of the same three-dimensional physical dental structure as the first three-dimensional digital structure 100 shown in FIG. 3. As a three-dimensional digital dental structure, the three-dimensional digital structure 100, e.g., comprises teeth 112. FIG. 5 shows first three-dimensional digital structure 100 of FIG. 1 registered with the second three-dimensional digital structure 110 shown of FIG. 4.

Figure 6:
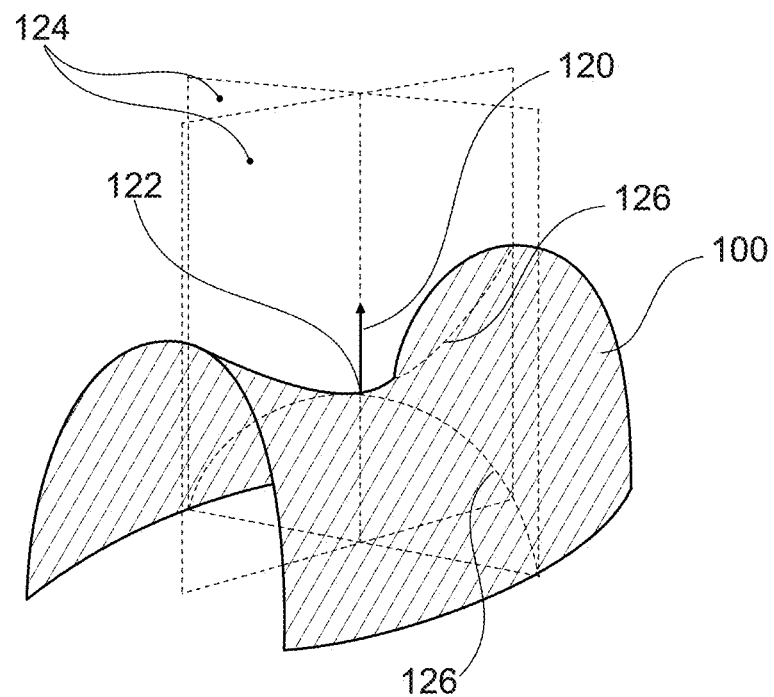
FIG. 6 illustrates exemplary geometric parameter of a curved surface of a three-dimensional digital structure.

FIG. 6 shows an exemplary curved surface, e.g., of a three-dimensional digital structure 100. At any point 122 on a surface of the three-dimensional digital structure 100, a normal vector 120, may be defined that extends perpendicular to the surface at point 122. Planes 124 containing the normal vector 120 are referred to as normal planes. The intersections of a normal planes 124 and the surface of the three-dimensional digital structure 100 form curves 126 referred to as a normal section and the curvature of this normal section is referred to as a normal curvature. Different normal sections 126 for a given point 122 on the surface of the three-dimensional digital structure 100 may have different curvatures. As the normal plane 124 is rotated around the normal vector at the given point 122, such that the normal plane 124 contains the normal vector and the given point 122, that curvature may vary. The maximum and minimum values of curvatures of these different normal sections 126 are referred the principal curvatures. The mean curvature is the mean of the two principal curvatures. The Gaussian curvature is the product of the two principal curvatures.

Figure 7:
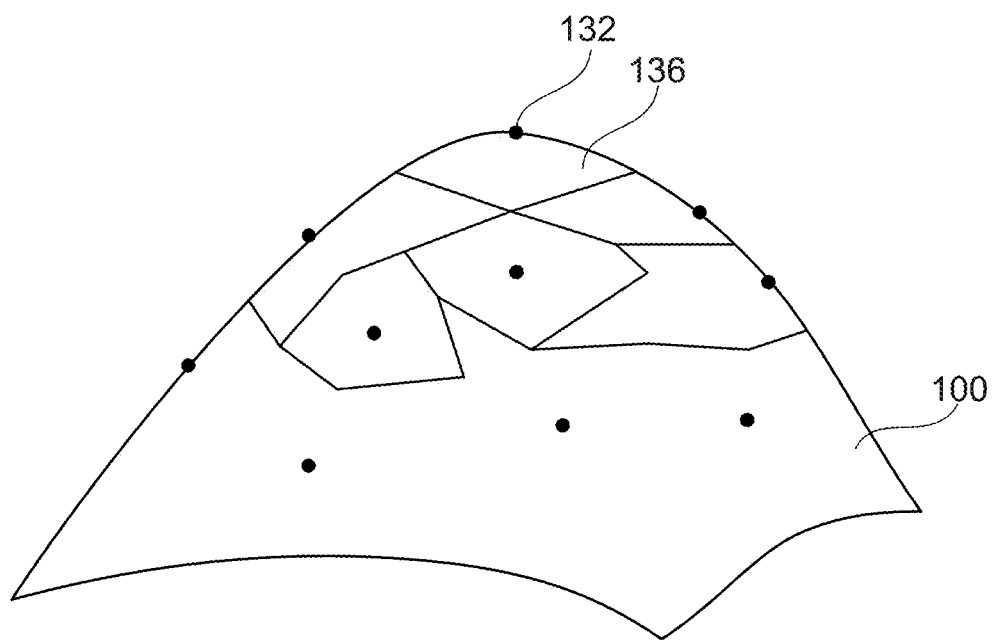
FIG. 7 shows an exemplary second three-dimensional digital structure represented by vertices of a polygonal mesh.

FIG. 7 shows an exemplary first three-dimensional digital structure 100, which may be represented by a polygonal mesh comprising a plurality of vertices 132. Each of these vertices 132 may be assigned with a region 136 of the three-dimensional digital structure 100. In order to determine structural features comprised by the three-dimensional digital structure 100, the regions 136 assigned to the individual vertices may be merged in order to define regions 136 with similar geometric features. The resulting merged regions 136 may be used to determine regions of interest comprised by the merged regions. These regions of interest may comprise structural features of the first three-dimensional digital structure 100 to be identified and used for determining a transformation suitable for registering the first three-dimensional digital structure 100 with a second three-dimensional digital structure. When merging regions 136, the regions 136 may be merged along edges of the mesh connecting the vertices 132, e.g., only if these edges do not connect two vertices 132 from the same region 136, do not connect a region 136 with a positive mean curvature with a region 136 with a negative mean curvature and the resulting merged region 136 resulting from a merging does not exceed a predefined delevelling threshold.

Figure 8:
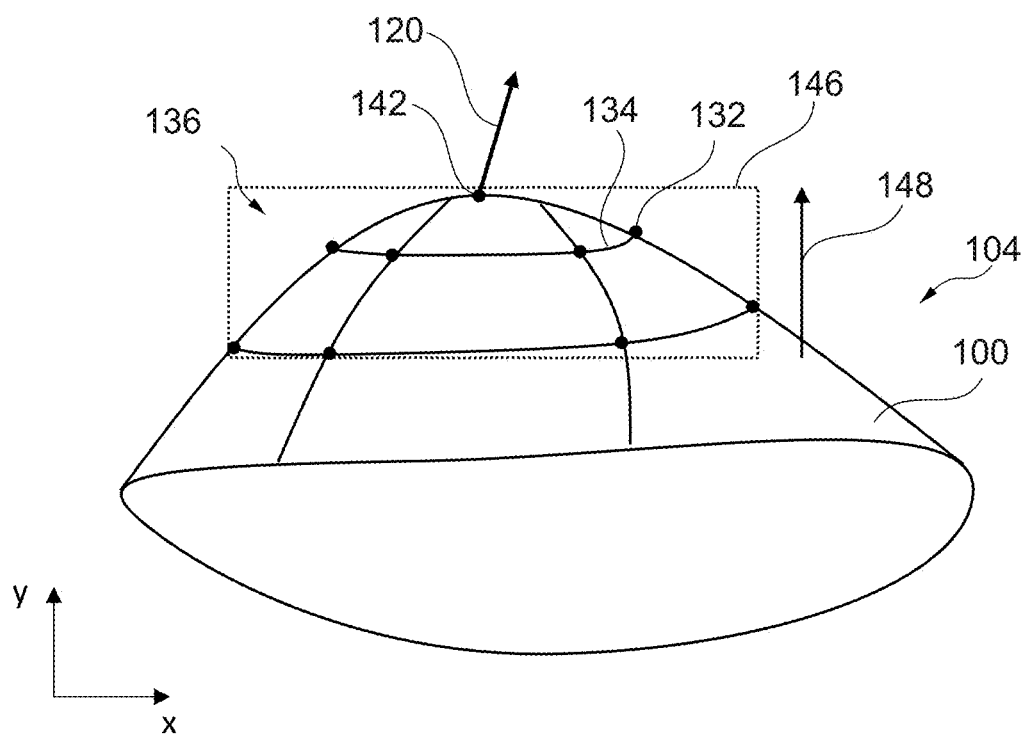
FIG. 8 shows exemplary geometric parameter of a curved surface of a region of a three-dimensional digital structure.

FIG. 8 shows an exemplary first three-dimensional digital structure 100 represented by a by a polygon mesh 104 comprising a plurality of vertices 132 and edges 134. In order to describe the geometric features of regions 136 of the three-dimensional digital structure 100, like the region shown in FIG. 8 comprising all the vertices 132 of FIG. 8, the following quantities may be used: a normal vector 120 of the region 136; an extreme vertex 142 comprised by the region 136, i.e., a highest or lowest vertex; an axis-aligned bounding box 146, i.e., a box 146 with a minimum size comprising all the vertices 132 of the region 136 and with the edges of the box 146 being aligned with coordinate axis of a coordinate system, within which the three-dimensional digital structure 100 is analyzed; and a distance vector 148 from a lower surface of the axis-aligned bounding box 146 of the region 136 to an upper surface of the axis-aligned bounding box 146.

Figure 9:
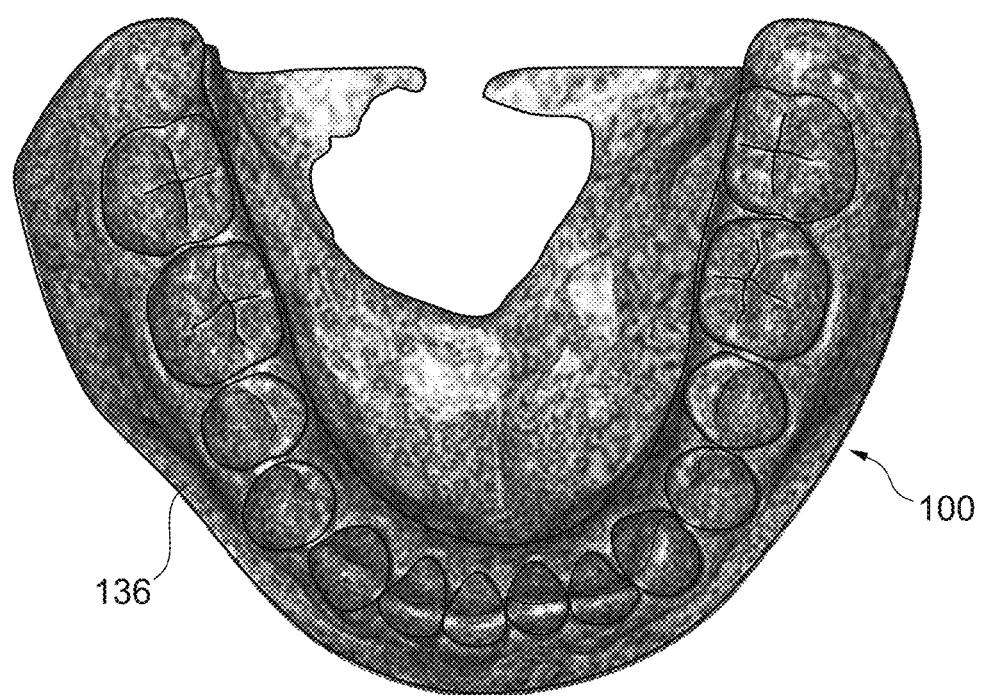
FIG. 9 shows an exemplary first three-dimensional digital structure with initial regions assigned to single vertices.
Figure 10:
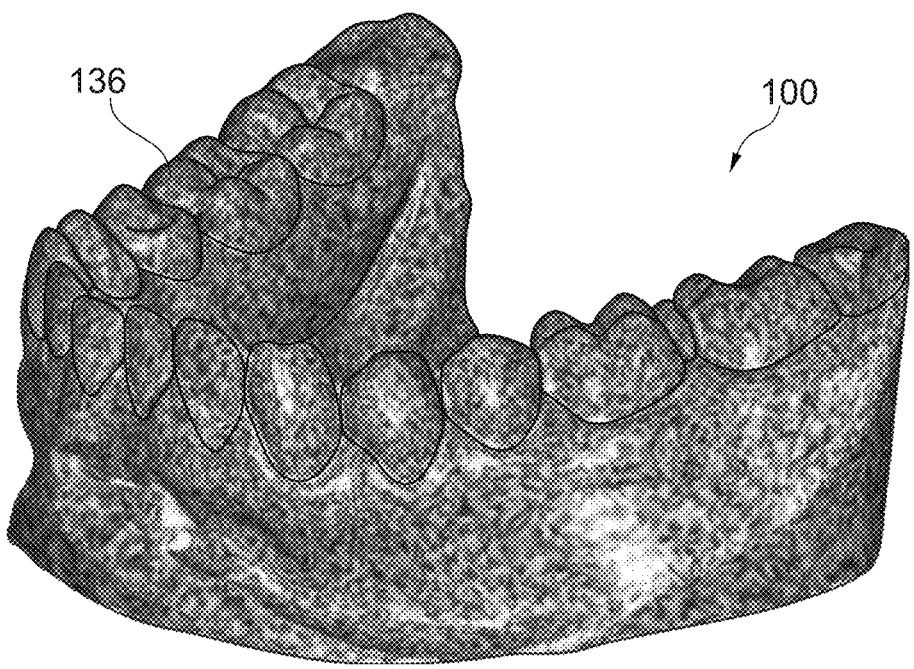
FIG. 10 shows an exemplary first three-dimensional digital structure with initial regions assigned to single vertices.
Figure 11:
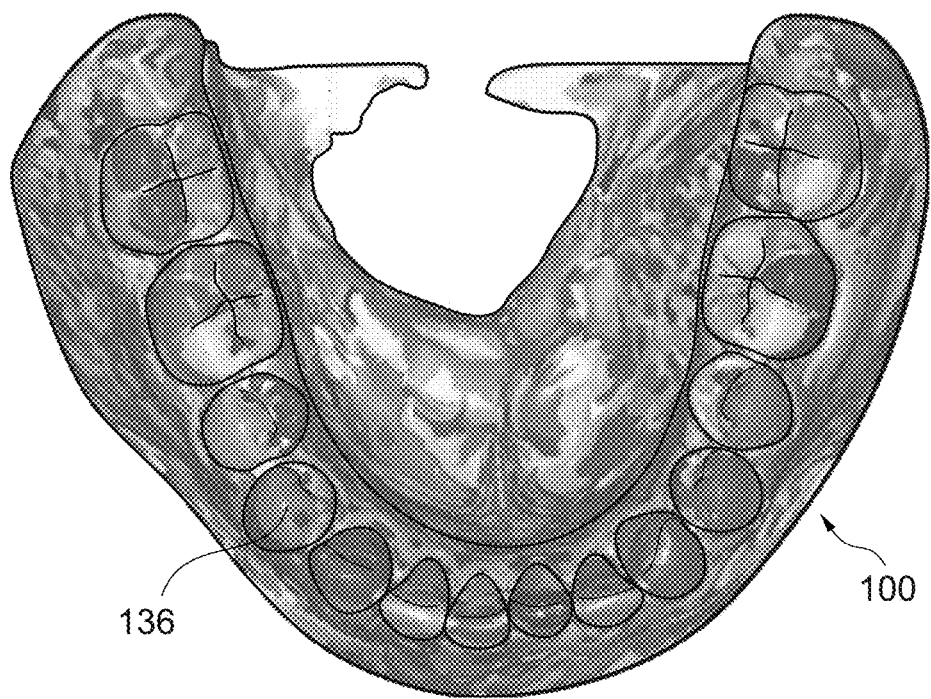
FIG. 11 shows an exemplary first three-dimensional digital structure with merged regions.
Figure 12:
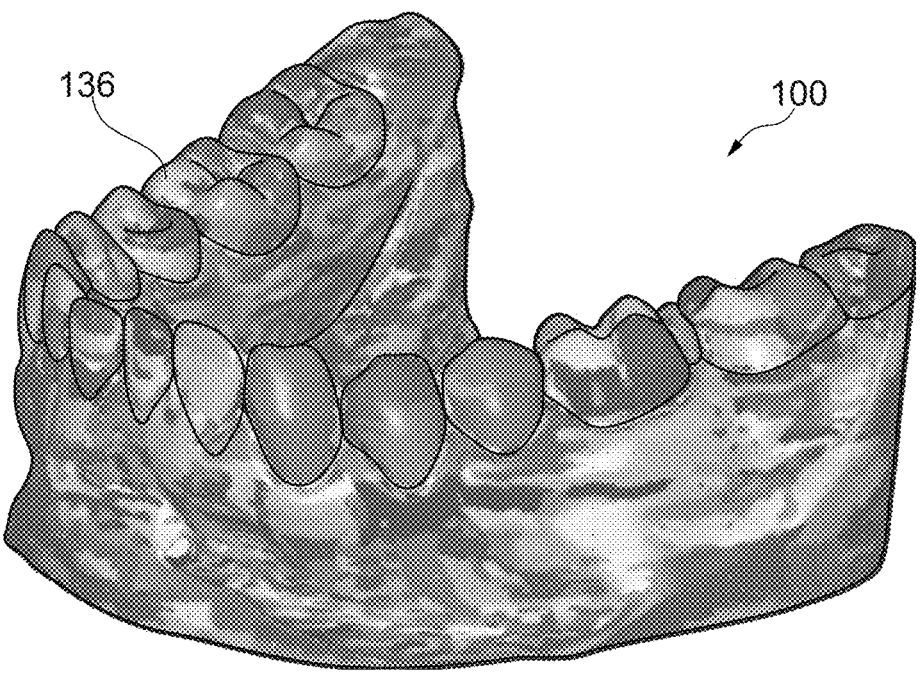
FIG. 12 shows an exemplary first three-dimensional digital structure with merged regions.

FIGS. 9 and 10 show two different views on an exemplary first three-dimensional digital structure 100, which is be represented by a polygonal mesh comprising a plurality of vertices and edges. In an initial state depicted in FIGS. 9 and 10, each of these vertices may be assigned with a region 136 of the three-dimensional digital structure 100. FIGS. 11 and 12 show the two different views on the exemplary first three-dimensional digital structure 100 of FIGS. 9 and 10, respectively, at a final state, after executing a merging of the regions 136. For example, regions 136 may have been along edges of the mesh connecting the vertices, only if these edges do not connect two vertices from the same region 136, do not connect a region 136 with a positive mean curvature with a region 136 with a negative mean curvature and the resulting merged region 136 resulting from a merging does not exceed a predefined delevelling threshold.

Figure 13:
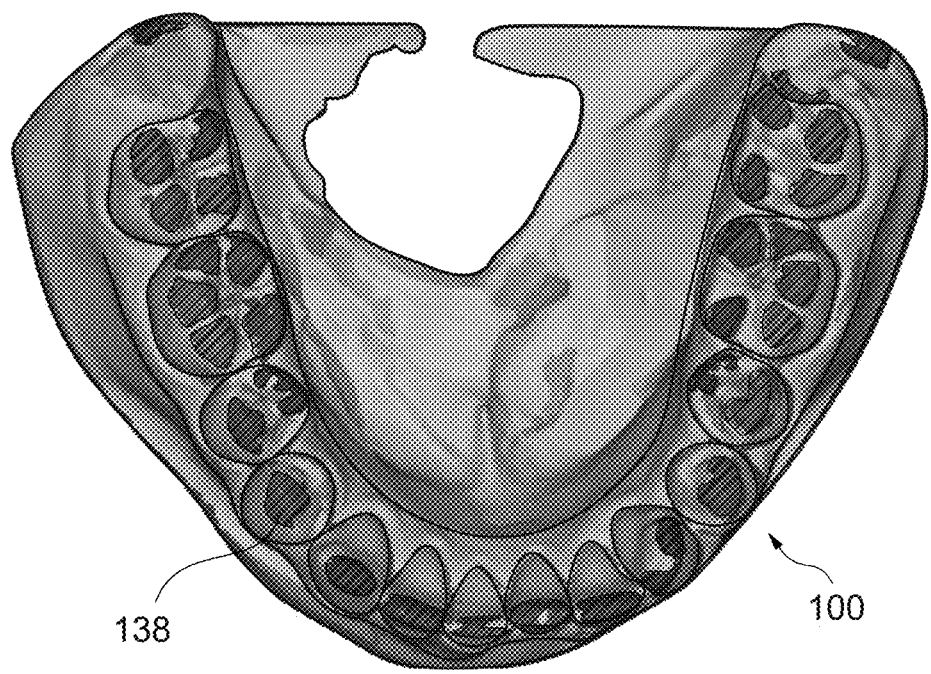
FIG. 13 shows an exemplary first three-dimensional digital structure with regions of interest.
Figure 14:
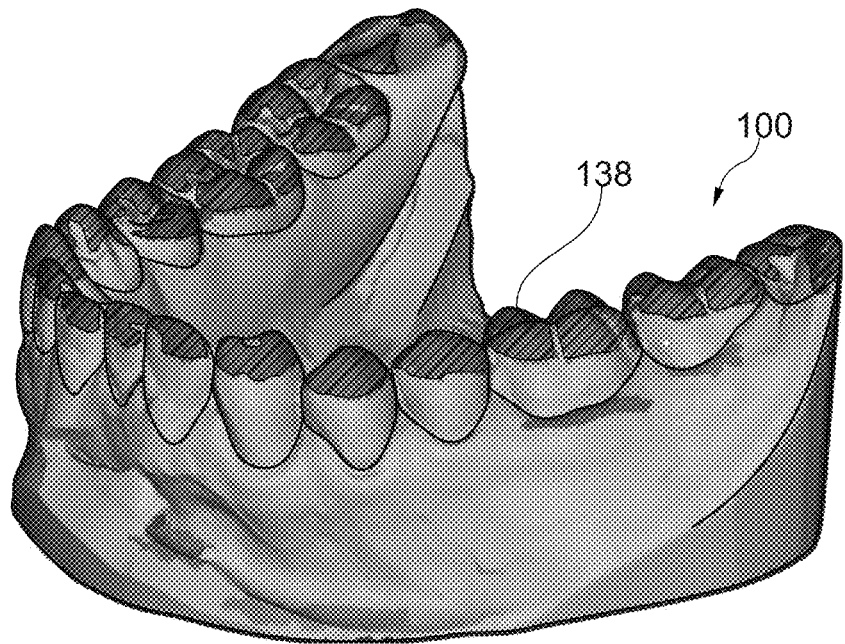
FIG. 14 shows an exemplary first three-dimensional digital structure with regions of interest.

FIGS. 13 and 14 show the two different views on the exemplary first three-dimensional digital structure 100 of FIGS. 11 and 12, respectively, after regions of interest 138 have been determined. From the merged regions 136 of FIGS. 11 and 12, those regions 138 of interest for determining structural features of the first three-dimensional digital structure 100 have been determined. The regions of interest 138 comprised by the regions 136 of FIGS. 11 and 12 resulting from the merging may be determined using one or more predefined structural criteria. For example, the one or more predefined structural criteria may comprise one or more of the following criteria: a predefined lower threshold for an area of the respective region 138, a predefined upper threshold for the area of the respective region 138, a predefined lower threshold for a ratio of an integral mean curvature and the area of the respective region 138, a predefined upper threshold for the ratio of the integral mean curvature and the area of the respective region 138, a predefined lower threshold for an angle between a surface normal of the respective region 138 and a surface normal of a predefined second reference plane, a predefined upper threshold for the angle between the surface normal of the respective region 138 and the surface normal of the predefined second reference plane.

Once the merging of the regions 136 of FIGS. 9 and 10 has been finished resulting in the merged regions 136 of FIGS. 11 and 12, e.g., different types of regions of interest 138 of FIGS. 13 and 14 comprised by the merged regions 136 of FIGS. 11 and 12 may be determined. In case the three-dimensional physical structure 100 is a three-dimensional physical dental structure, e.g., cusps or incisal edges and fissures may be determined as the relevant two types of regions of interest 138. Regions of interest 138 with positive curvatures may, e.g., represent fissures. Regions of interest 138 with negative curvatures may, e.g., represent cusps or incisal edges.

Figure 15:
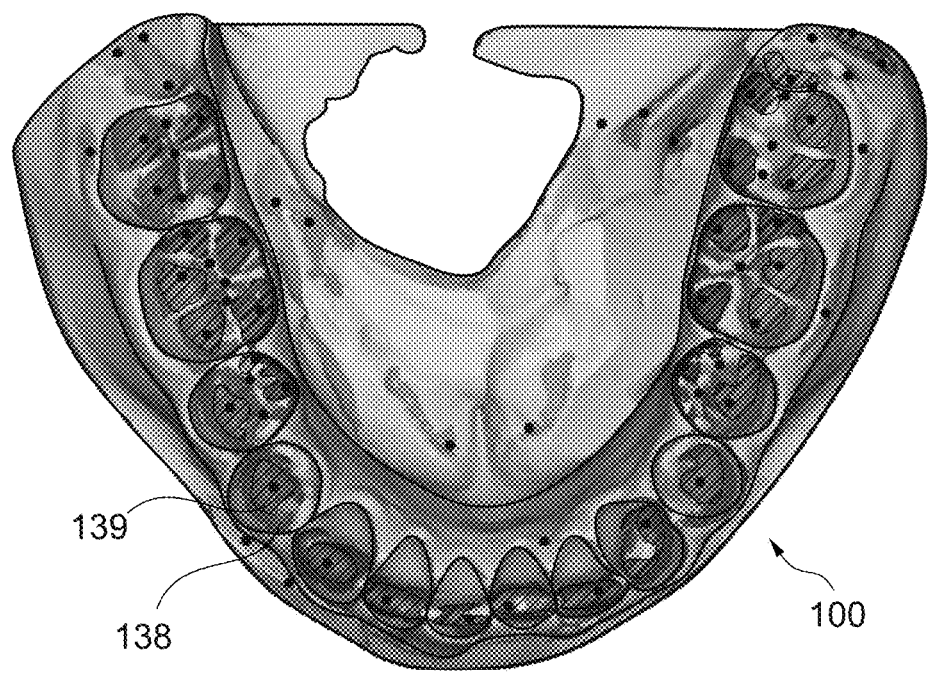
FIG. 15 shows an exemplary first three-dimensional digital structure with regions of interest and structural features represented by feature points.
Figure 16:
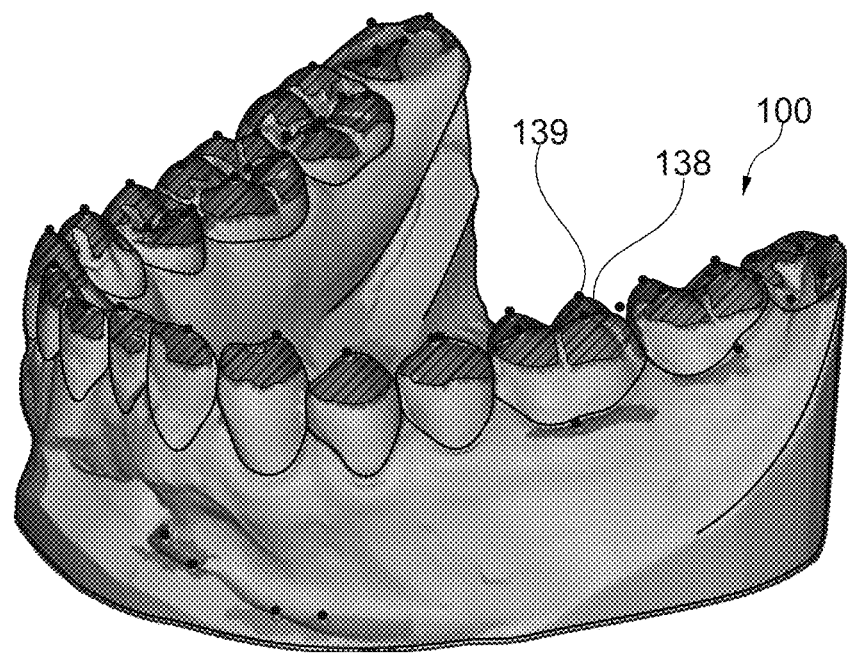
FIG. 16 shows an exemplary first three-dimensional digital structure with regions of interest and structural features represented by feature points.

FIGS. 15 and 16 show the two different views on the exemplary first three-dimensional digital structure 100 of FIGS. 13 and 14, respectively. For each of the region of interest 138 a feature point 139 is determined representing a structural feature of the three-dimensional digital structure 100 to be used for the further analysis. The feature points 139 of the regions of interest 138 are each provided by an extremum within the respective region of interest 138. The extrema within the regions of interest 138 may, e.g., be highest points, i.e., maxima, in case of cusps or incisal edges. The extrema within the regions of interest 138 may, e.g., be lowest points, i.e., minima, in case of fissures.

Figure 17:
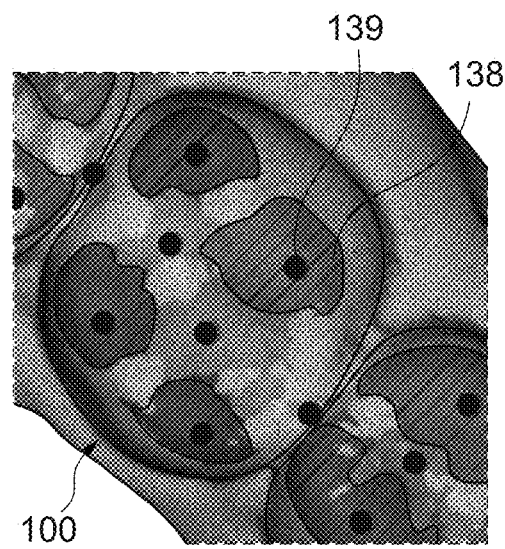
FIG. 17 shows exemplary teeth of an exemplary first three-dimensional digital structure with regions of interest and structural features represented by feature points.
Figure 18:
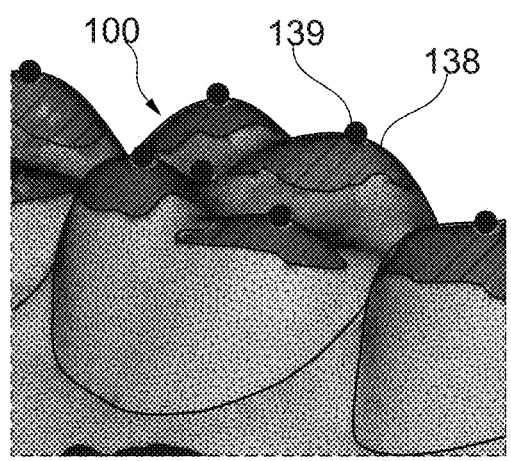
FIG. 18 shows exemplary teeth of an exemplary first three-dimensional digital structure with regions of interest and structural features represented by feature points.

FIGS. 17 and 18 show two different detailed views on an exemplary tooth comprised by the exemplary first three-dimensional digital structure 100 of FIGS. 13 and 14, with a feature point 139 determined for each of the region of interest 138 representing the structural features of the three-dimensional digital structure 100.

Figure 19:
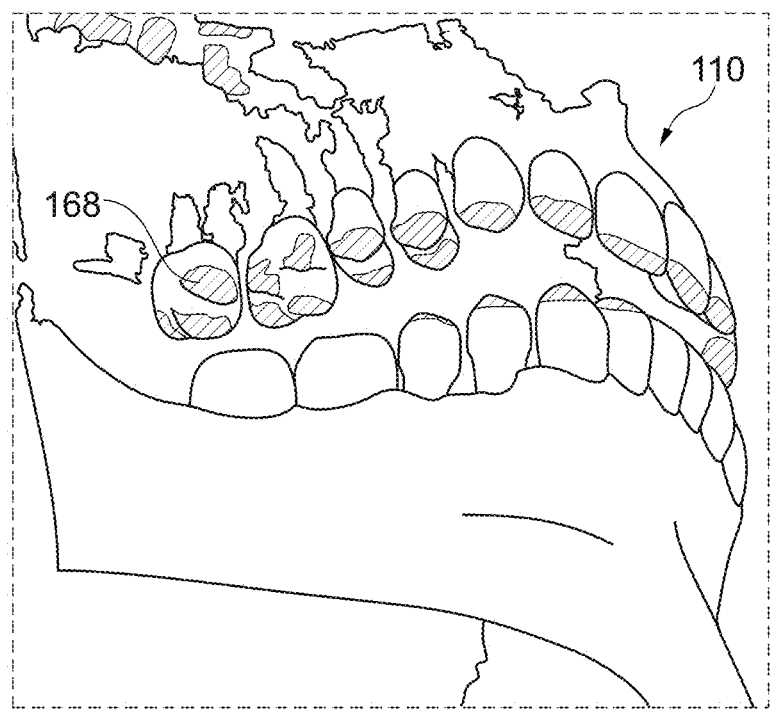
FIG. 19 shows an exemplary second three-dimensional digital structure with regions of interest.

FIG. 19 shows an exemplary second three-dimensional digital structure 110 with regions of interest 168 identified. In case the three-dimensional physical structure 110 is a three-dimensional physical dental structure, e.g., cusps or incisal edges and fissures may be determined as the relevant types of regions of interest 168. Regions of interest 168 with positive curvatures may, e.g., represent fissures. Regions of interest 168 with negative curvatures may, e.g., represent cusps or incisal edges.

Figure 20:
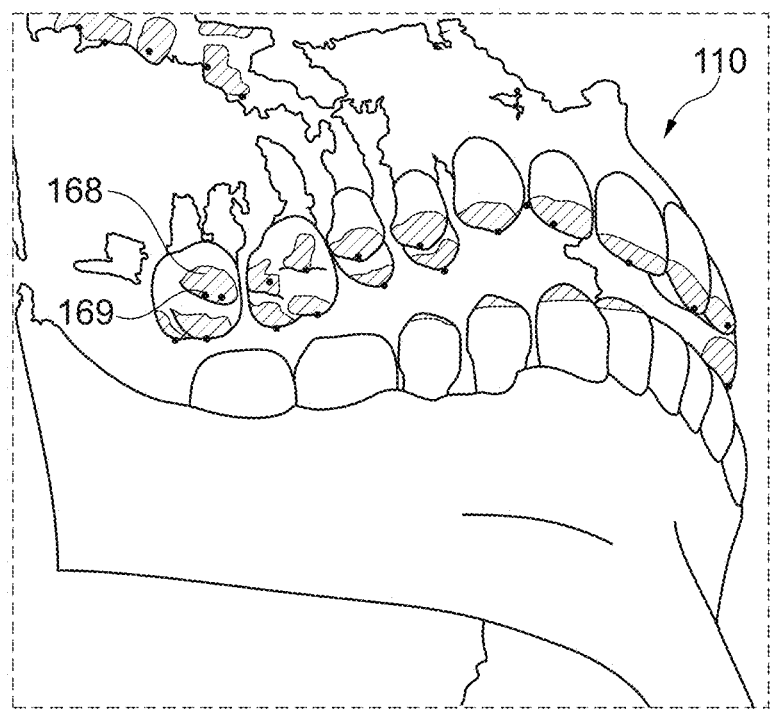
FIG. 20 shows an exemplary second three-dimensional digital structure with regions of interest and structural features represented by feature points.

FIG. 20 shows the second three-dimensional digital structure 110 of FIG. 19 with a feature point 169 determined for each of the region of interest 168 representing the structural features of the three-dimensional digital structure 110. The feature points 169 of the regions of interest 168 are each provided by an extremum within the respective region of interest 168. The extrema within the regions of interest 168 may, e.g., be highest points, i.e., maxima, in case of cusps or incisal edges. The extrema within the regions of interest 168 may, e.g., be lowest points, i.e., minima, in case of fissures.

Figure 21:
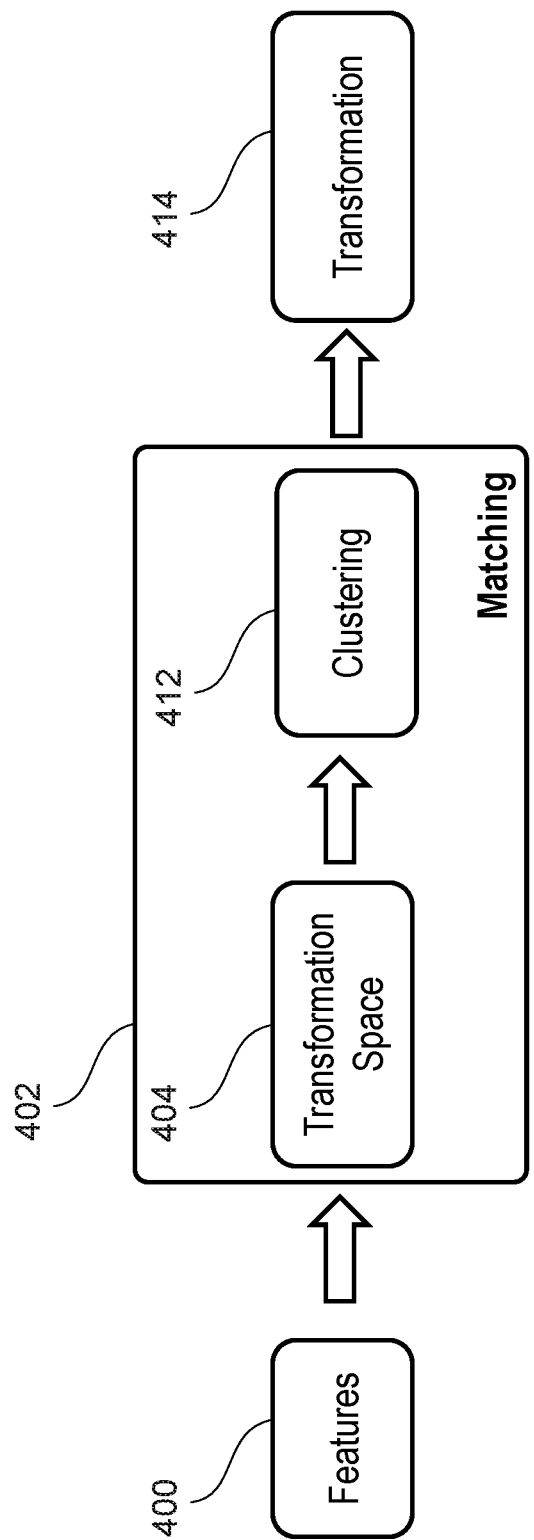
FIG. 21 shows a flowchart illustrating an exemplary method for registering a first three-dimensional digital structure and a second three-dimensional digital structure.

FIG. 21 shows an exemplary method for determining a rigid spatial transformation, in order to register a first three-dimensional digital structure and a second three-dimensional digital structure. In block 400, first structural features of the first three-dimensional digital structure are determined using one or more predefined structural criteria. Furthermore, second structural features of the second three-dimensional digital structure are determined using the one or more predefined structural criteria. The first structural features may, e.g., be provided in form of first feature points as the feature points depicted in FIGS. 15 to 18. The second structural features may, e.g., be provided in form of second feature points as the feature points depicted in FIG. 20. In block 402 a matching between the first and second features is executed. This matching 402 comprises in block 404 determining potential rigid spatial transformations between the first and second features represented by points in a transformation space. Each of the points in the transformation space is descriptive of a potential rigid spatial transformation. In block 412, a clustering of the points assigned in the transformation space is used for determining a rigid spatial transformation to be used for registering the first three-dimensional digital structure and second three-dimensional digital structure. In block 414, the determined rigid spatial transformation is used for registering the first three-dimensional digital structure and second three-dimensional digital structure.

Figure 22:
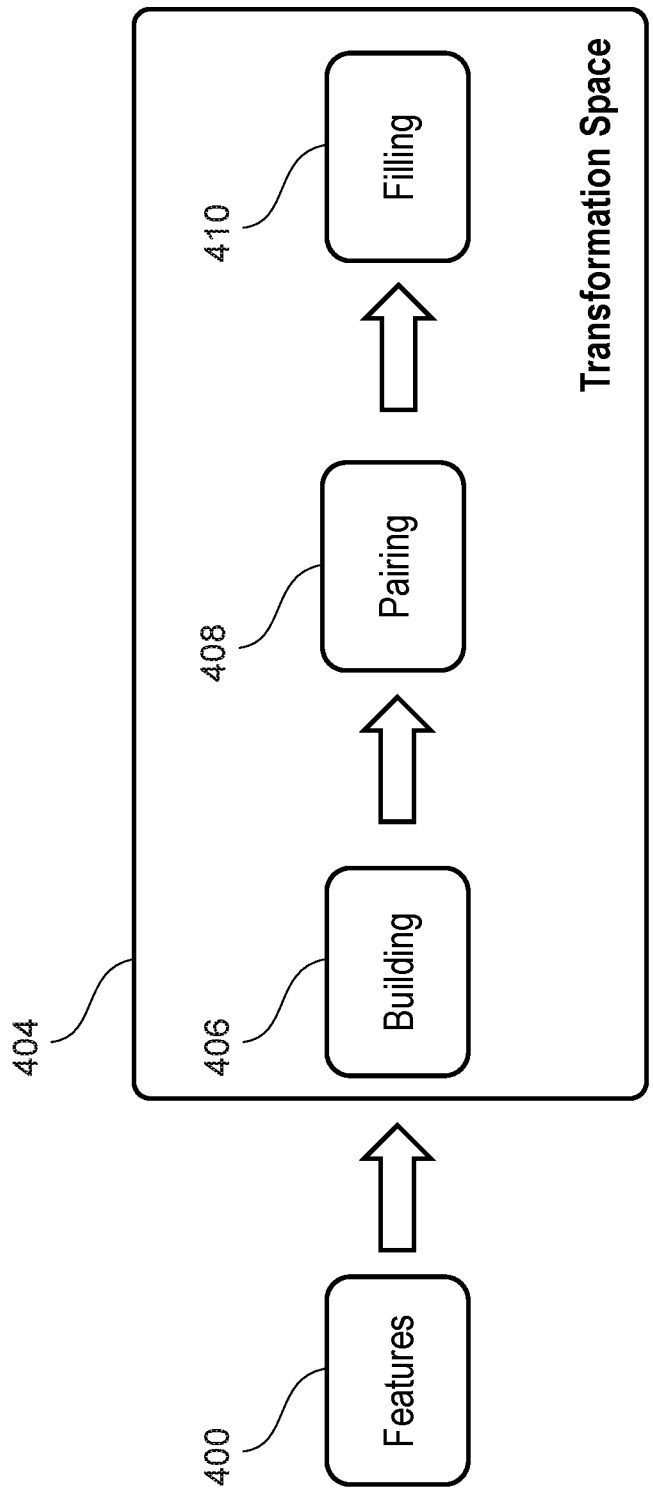
FIG. 22 shows a flowchart illustrating exemplary details of the method of FIG. 21.

FIG. 22 shows block 404 of exemplary method of FIG. 21 with the determining of potential rigid spatial transformations between the first and second features represented by points in the transformation space in some more detail. Block 404 comprises in block 406 a building of n-gons for both three-dimensional digital structures. For the first three-dimensional digital structures, a first plurality of first feature sets of first structural features resulting from the feature extraction in block 400 is determined. Each of the first feature sets comprises n first structural features of the determined first structural features, wherein the n first structural features are descriptive of a first n-gon and n is a natural number of three or more. For the second three-dimensional digital structures, a second plurality of second feature sets of second structural features resulting from the feature extraction in block 400 is determined. Each of the second feature sets comprises n second structural features of the determined second structural features, wherein the n second structural features are descriptive of a second n-gon. For example, the n-gons may be triangles with n=3.

Using the feature extraction, a number of points to be taken into account for the determining of the rigid spatial transformations may be significantly reduced. For example, by determining distinctive feature points, it may be managed to reduce the number of vertices per mesh, i.e., three-dimensional digital structure, from, e.g., up to one million vertices per mesh, down to, e.g., fifty to one hundred of feature points per three-dimensional digital structure. Using these fifty to one hundred feature points per three-dimensional digital structure, e.g., one thousand to one hundred thousand n-gons in form of triangles may be determine per three-dimensional digital structure. Using these one thousand to one hundred thousand n-gons per three-dimensional digital structure, the pairing may, e.g., result in five hundred thousand to one million pairs. For each of these pairs a point in the transformation space may be determined representing the rigid spatial transformation described by the respective pair of n-gons.

Figure 23:
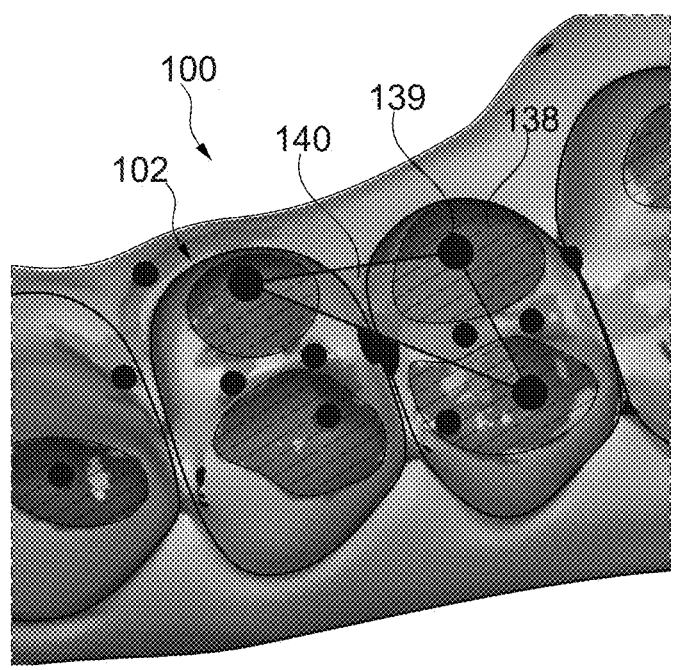
FIG. 23 shows exemplary teeth of an exemplary first three-dimensional digital structure with a feature set of structural features descriptive of an exemplary n-gon.
Figure 24:
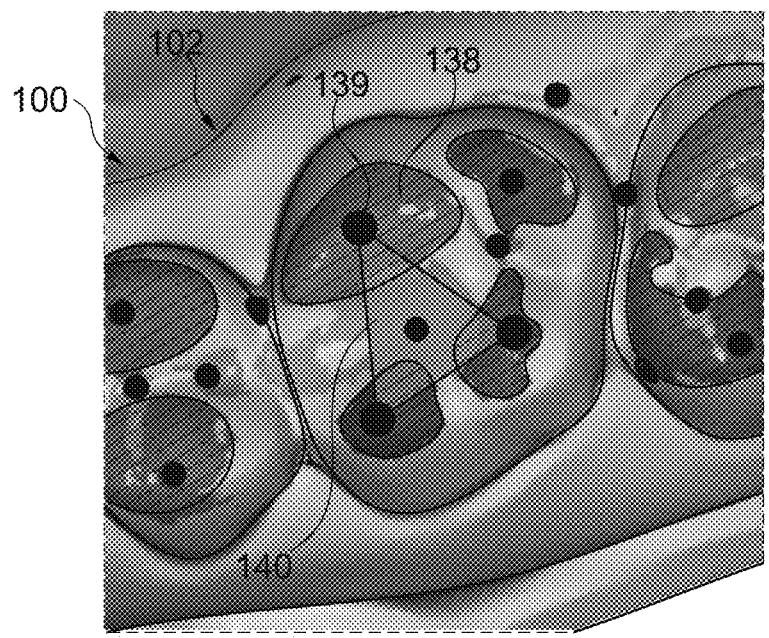
FIG. 24 shows exemplary teeth of an exemplary first three-dimensional digital structure with a feature set of structural features descriptive of an exemplary n-gon.

FIG. 23 shows exemplary teeth 102 of an exemplary first three-dimensional digital structure 100 with regions of interest 138 identified. For each of the region of interest 138 a feature point 139 is determined representing a structural feature of the three-dimensional digital structure 100. The feature points 139 of the regions of interest 138 are each provided by an extremum within the respective region of interest 138. The extrema within the regions of interest 138 may, e.g., be highest points, i.e., maxima, in case of cusps or incisal edges. The extrema within the regions of interest 138 may, e.g., be lowest points, i.e., minima, in case of fissures. Furthermore, an exemplary n-gon 140 in form of a triangle, i.e., with n=3, is depicted. The n feature points 139 defining the corners of the n-gon 140 form a feature set of structural features represented by the respective feature points 139. For example, all possible combination of n feature points 139 determined for the three-dimensional digital structure 100 defining different n-gons 140 may be determined as the feature set of structural features of the three-dimensional digital structure 100. The n-gon 140 shown in FIG. 23 is, e.g., defined by feature points 139 of different teeth 102 comprised by the three-dimensional digital structure 100. FIG. 24 shows another exemplary n-gone 140 of the first three-dimensional digital structure 100 of FIG. 23 defined by another set of feature points 139 determined for another tooth 102 of the three-dimensional digital structure 100.

Figure 25:
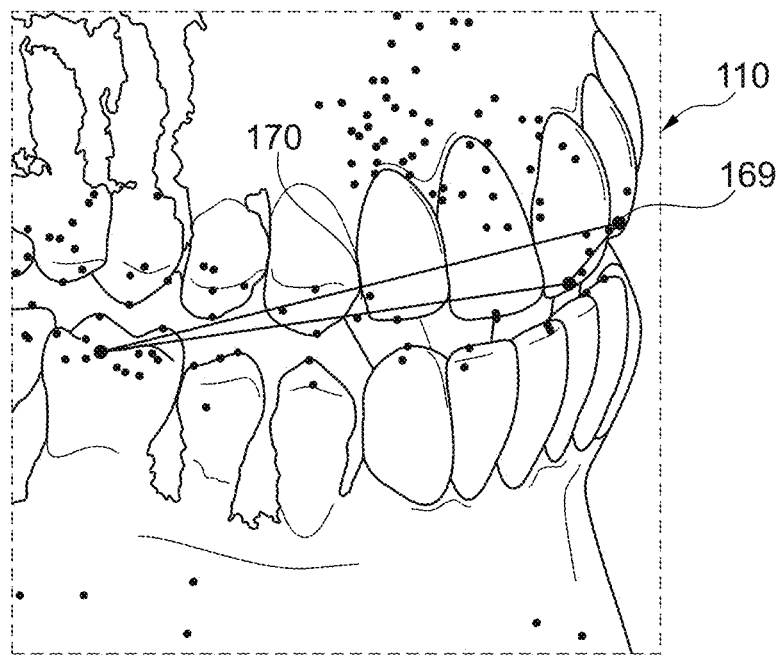
FIG. 25 shows an exemplary second three-dimensional digital structure with a feature set of structural features descriptive of an exemplary n-gon.

FIG. 25 shows an exemplary second three-dimensional digital structure 110 with feature points 169 representing structural features of the second three-dimensional digital structure 110 depicted. An exemplary n-gon 170 in form of a triangle, i.e., with n=3, is depicted. The n feature points 169 defining the corners of the n-gon 170 form a feature set of structural features represented by the respective feature points 169. For example, all possible combination of n feature points 169 determined for the three-dimensional digital structure 110 defining different n-gons 170 may be determined as the feature set of structural features of the three-dimensional digital structure 110. The n-gon 170 shown in FIG. 25 is, e.g., defined by feature points 169 of different teeth comprised by the three-dimensional digital structure 110.

Figure 26:
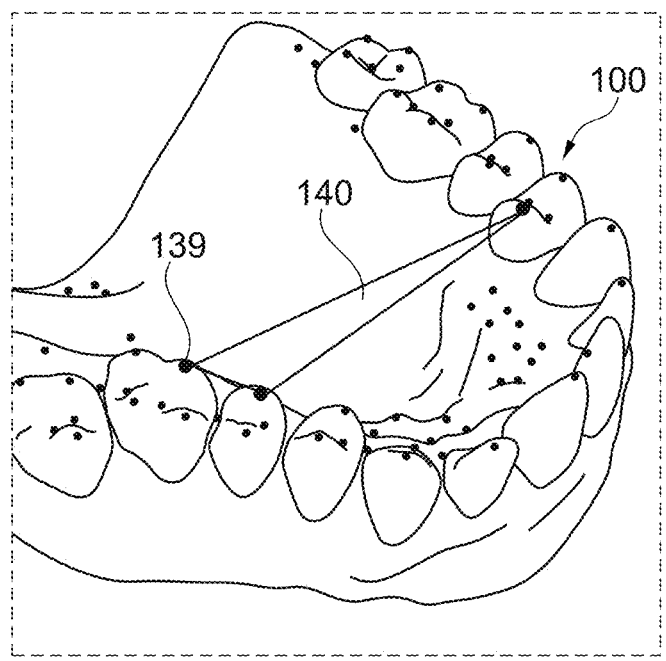
FIG. 26 shows an exemplary first three-dimensional digital structure with a feature set of structural features descriptive of an exemplary n-gon.

FIG. 26 shows an exemplary first three-dimensional digital structure 100 with feature points 139 representing structural features of the first three-dimensional digital structure 100 depicted. An exemplary n-gon 140 in form of a triangle, i.e., with n=3, is depicted. The n feature points 139 defining the corners of the n-gon 140 form a feature set of structural features represented by the respective feature points 139. For example, all possible combination of n feature points 139 determined for the three-dimensional digital structure 100 defining different n-gons 140 may be determined as the feature set of structural features of the three-dimensional digital structure 100. The n-gon 140 shown in FIG. 26 is, e.g., defined by feature points 139 of different teeth 102 comprised by the three-dimensional digital structure 100.

Figure 27:
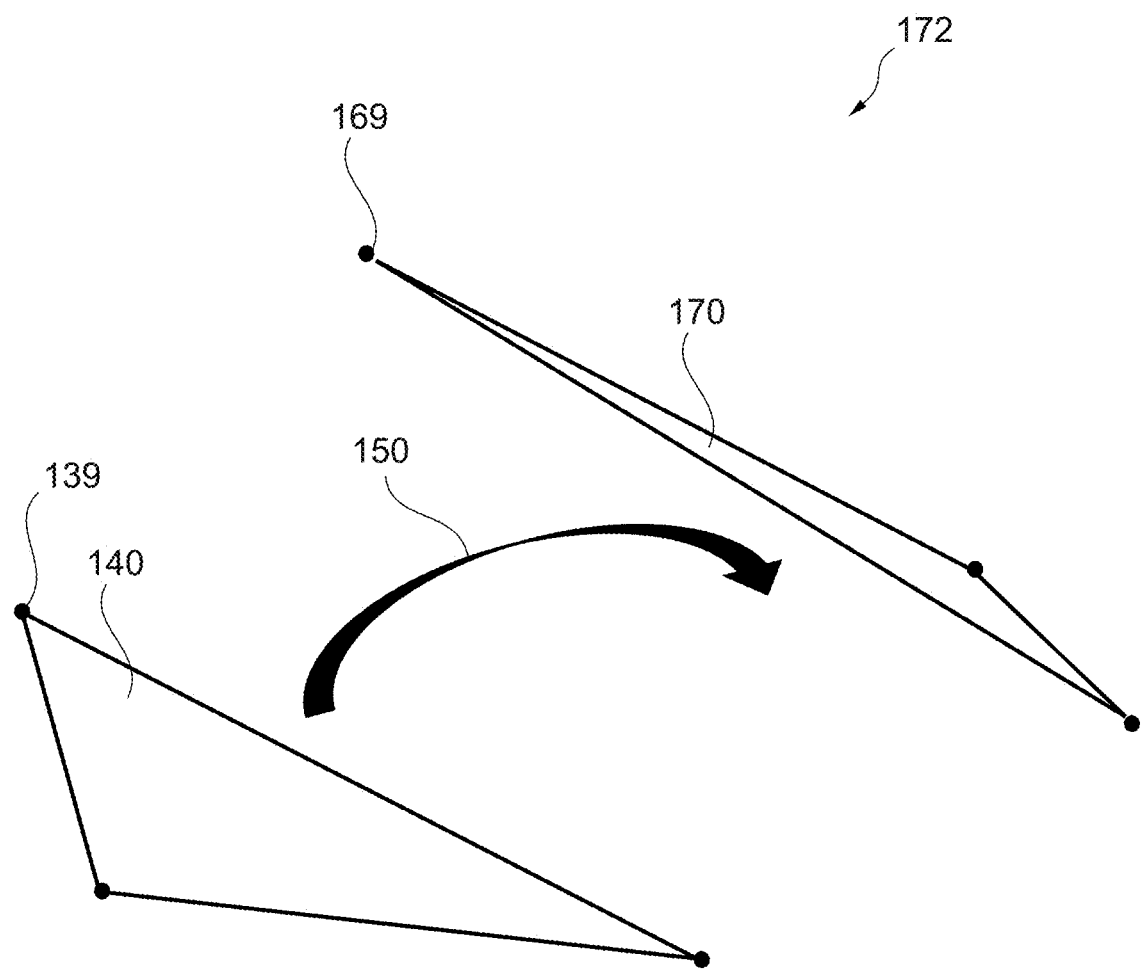
FIG. 27 shows an exemplary pair of n-gons.

FIG. 27 shows an exemplary pair 172 two exemplary n-gons 140, 170 determined for first three-dimensional digital structure and a second three-dimensional digital structure, respectively. The first n-gon 140 is defined by n structural features represented by n feature points 139 determined for the first three-dimensional digital structure. The n feature points 139 define the n corners of n-gon 140. The depicted n-gon 140 is, e.g., a triangle with n=3. The second n-gon 170 is defined by n structural features represented by n feature points 169 determined for the second three-dimensional digital structure. The n feature points 169 define the n corners of n-gon 170. The depicted n-gon 170 is, e.g., a triangle with n=3. The two n-gons 140, 170 satisfy a congruence criterion, e.g., a degree of congruence may be sufficiently high, such that the two n-gons 140, 170 are paired. A degree of congruence may, e.g., be sufficiently high, if deviations from congruence are smaller than a predefined threshold. The two n-gons 140, 170 are related by a rigid spatial transformation 150, with which the two n-gons 140, 170 may be registered. Thus, the pair 172 defines a rigid spatial transformation 150, which may be represented by a point in a transformation space, e.g., a k-dimensional transformation space with k=3·n. Assigning points in the transformation space to all pairs of n-gons determined for the first three-dimensional digital structure and the second three-dimensional digital structure, the transformation space may be filled with points representing potential rigid spatial transformations. Using a clustering of the points assigned in the transformation space, i.e., identifying a cluster of points, a rigid spatial transformation may be determined, which corresponds within tolerances to most of the pairs. This rigid spatial transformation may be used for registering the first three-dimensional digital structure with the second three-dimensional digital structure.

For example, a plurality of clusters may be identified as a result of the clustering with each cluster representing a rigid spatial transformation. One of these identified clusters may be selected for determining the rigid spatial transformation for registering the first three-dimensional digital structure with the second three-dimensional digital structure. For example, the rigid spatial transformations represented by the identified clusters may be determined. The determining of the rigid spatial transformations may comprise determining points of the identified clusters. Each of the determined points may be a point in the transformation space representing a specific rigid spatial transformation. For example, the determining of the rigid spatial transformations may comprise determining means of the identified clusters. Each of the determined means may be a point in the transformation space representing a specific rigid spatial transformation, which may thus be represented by the respective cluster.

For example, the method may further comprise calculating a surface fit error for one or more of the rigid spatial transformations represented by the determined points or means of the identified clusters. The surface fit error may, e.g., take into account a combination of distances between vertices, e.g., structural features, of one of the two three-dimensional digital structures to be transformed after the transformation and nearest vertices, e.g., structural features, of the other three-dimensional digital structure. The surface fit error may, e.g., take into account a combination of angles between surface normals at the vertices, e.g., structural features, of the three-dimensional digital structure to be transformed after the transformation and surface normals at the nearest vertices, e.g., structural features, of the other three-dimensional digital structure. Furthermore, adjustment parameters may be used, which enable an adjusting of a weighting of the angles between the surface normal, descriptive of deviations of orientations resulting from the respective transformation, and the distances between the vertices, descriptive of deviations of positions resulting from the respective transformation.

For example, a rigid spatial transformation with a smallest surface fit error may be selected from the rigid spatial transformations represented by the identified clusters as the rigid spatial transformation for registering the first three-dimensional digital structure with the second three-dimensional digital structure. Thereby, an automatic selection of a rigid spatial transformation to be used for registering the first three-dimensional digital structure with the second three-dimensional digital structure may be provided.

Alternatively, a list of rigid spatial transformations represented by the identified clusters may be output and one of these rigid spatial transformations may be selected by an input being received in response to the outputting of the list. The list may, e.g., be an order list. The ordered list may, e.g., be ordered using the surface fit errors calculated for the rigid spatial transformations represented by the identified clusters.

Figure 28:
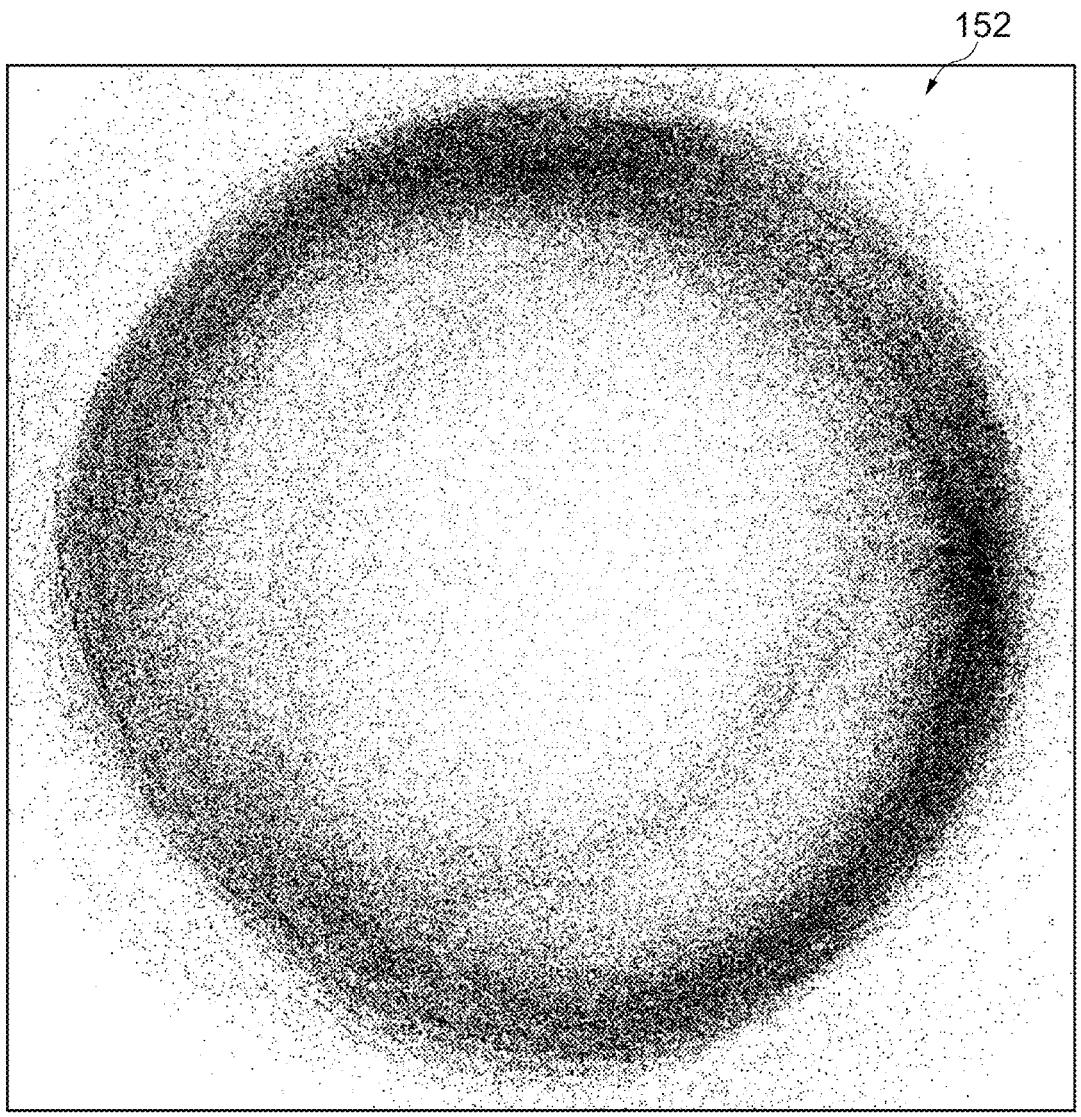
FIG. 28 shows an exemplary 3D representation of a 9D transformation space comprising points representing rigid spatial transformations between n-gons.
Figure 29:
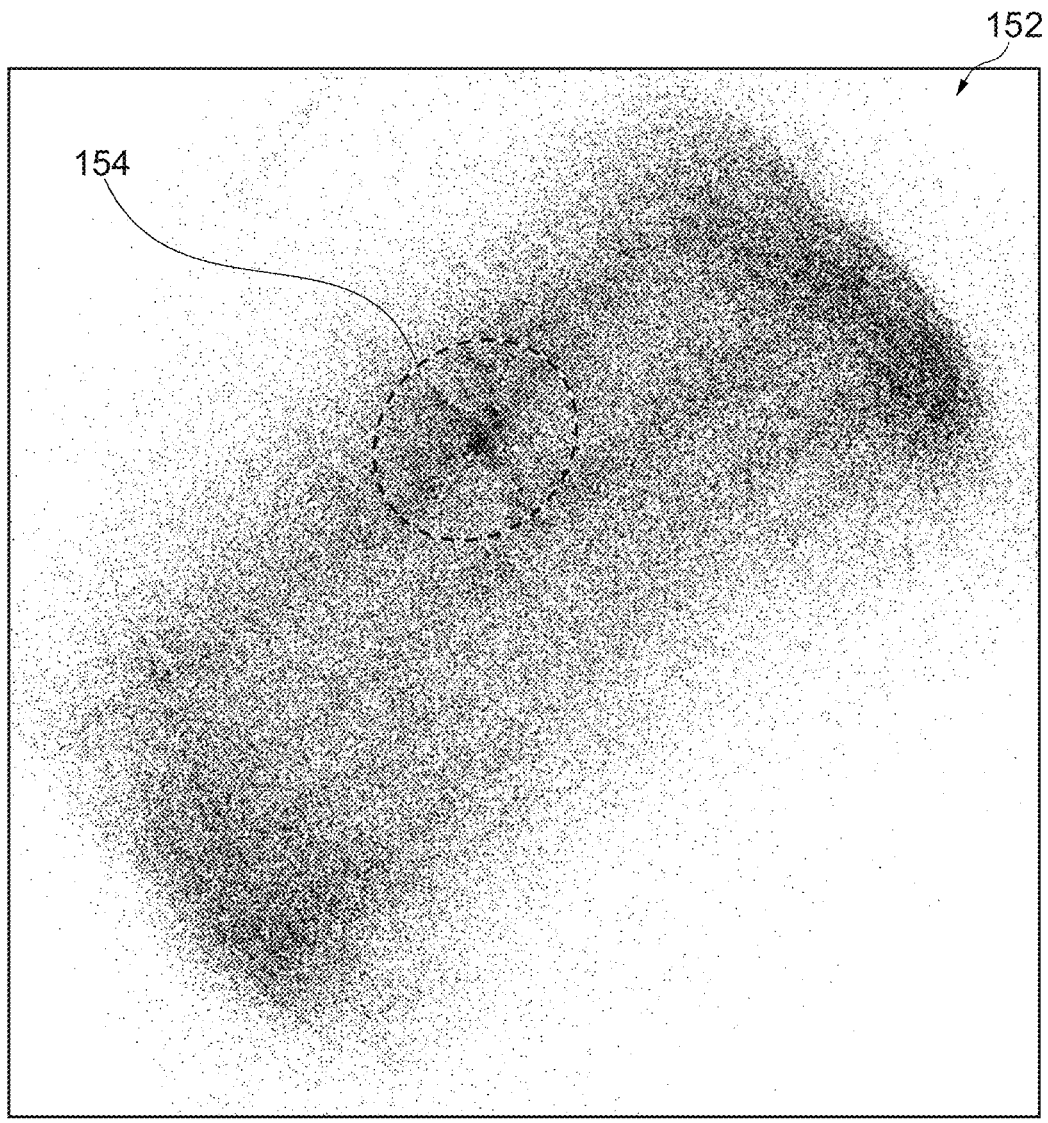
FIG. 29 shows an exemplary clustering of points in 3D representation of a 9D transformation space of FIG. 28.
Figure 30:
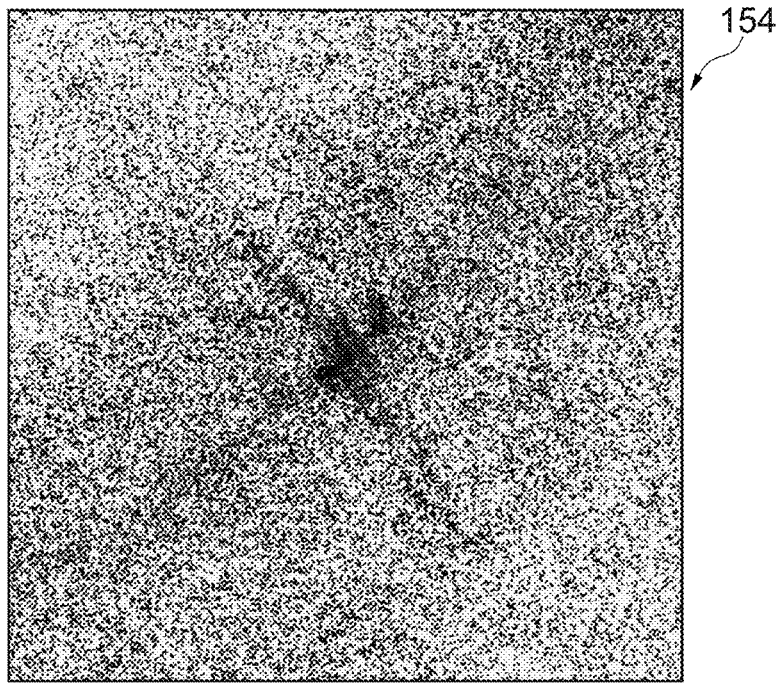
FIG. 30 shows a detailed view of the exemplary clustering of FIG. 29.
Figure 31:
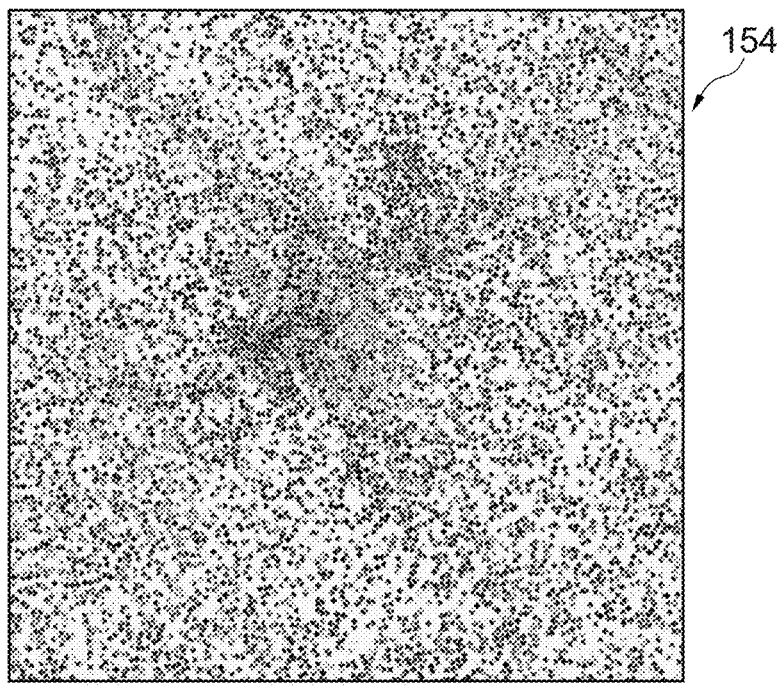
FIG. 31 shows a detailed view of the exemplary clustering of FIG. 29.
Figure 32:
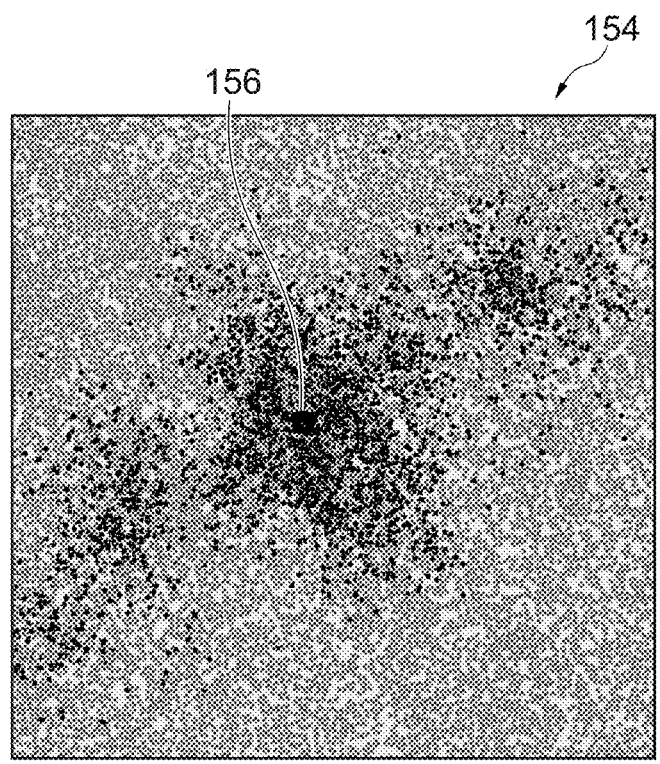
FIG. 32 shows an exemplary mean determined for the clustering of FIG. 29.

FIG. 28 shows a three-dimensional representation of the points 152 representing rigid spatial transformations in a nine-dimensional transformation space. The dimensionality of the transformation space may be reduced, e.g., using PCA. Principal component analysis (PCA) is a method for analyzing large datasets containing a high number of dimensions per observation, increasing the interpretability of data while preserving the maximum amount of information, and enabling the visualization of multidimensional data. Formally, PCA is a statistical method for reducing the dimensionality of a dataset. This may be accomplished by linearly transforming the data into a new coordinate system, where at least most of the variation in the data may be described with fewer dimensions than the initial data. FIG. 29 shows the points 152 of FIG. 28 from another perspective. As may be seen in FIG. 29, the points 152 of FIG. 28 form a cluster 154. This cluster 154 is depicted in mor detail in FIGS. 30 and 31. A rigid spatial transformation represented by cluster 154 may be determined and used for registering a first three-dimensional digital structure and a second three-dimensional digital structure. As illustrated in FIG. 32, e.g., a mean 156 of the cluster 154 may be determined identifying the rigid spatial transformation represented by cluster 154 and used for registering the first three-dimensional digital structure and the second three-dimensional digital structure.

FIG. 33 to FIG. 48 show exemplary registrations of first and second three-dimensional digital structures 100, 110, using rigid spatial transformations determined according to examples of the method for registering a first three-dimensional digital structure and a second three-dimensional digital structure described herein.

Figure 33:
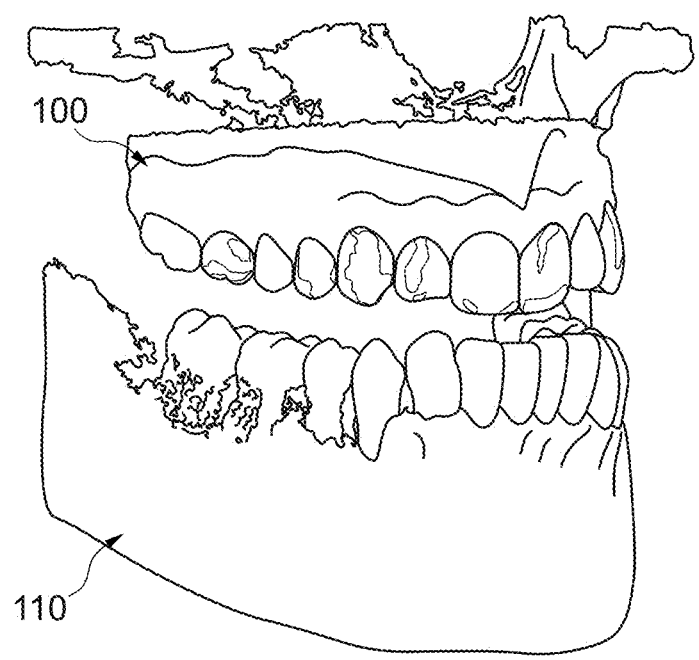
FIG. 33 shows an exemplary registration of a first three-dimensional digital structure and a second three-dimensional digital structure.

FIG. 33 shows an exemplary registration of an exemplary first set comprising an exemplary first three-dimensional digital structures 100 and an exemplary second three-dimensional digital structures 110 using a rigid spatial transformation determined according to an example of the method for registering the first three-dimensional digital structure 100 and the second three-dimensional digital structure 110 described herein.

Figure 34:
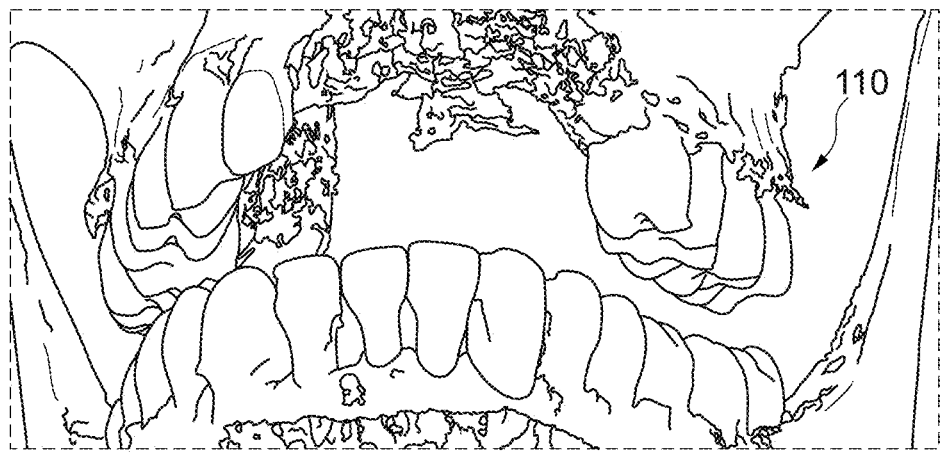
FIG. 34 shows an exemplary second three-dimensional digital structure.
Figure 35:
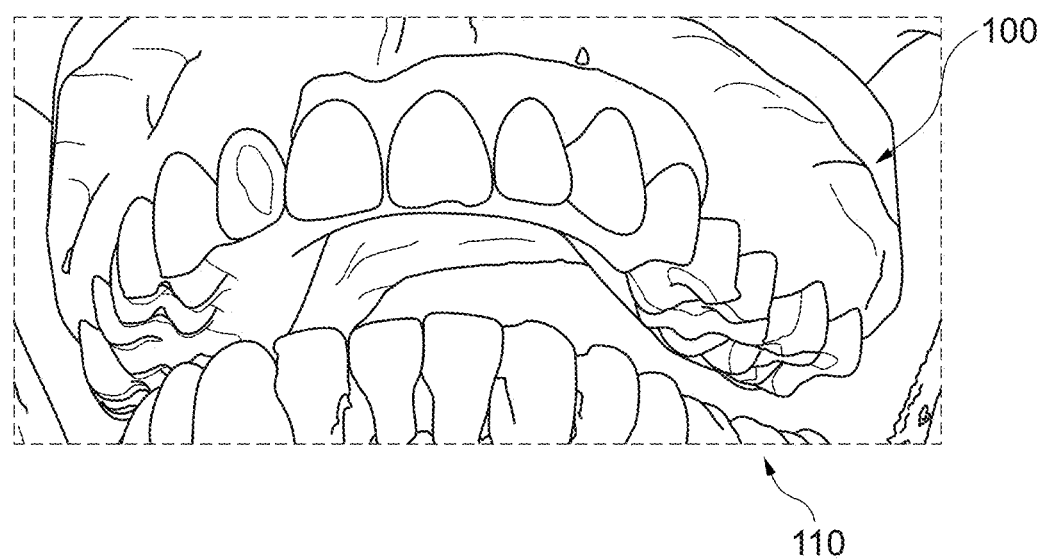
FIG. 35 shows an exemplary registration of a first three-dimensional digital structure and a second three-dimensional digital structure.

FIG. 34 shows an exemplary second three-dimensional digital structure 110. FIG. 35 shows an exemplary registration of an exemplary second set comprising an exemplary first three-dimensional digital structure 100 and the exemplary second three-dimensional digital structure 110 of FIG. 34 using a rigid spatial transformation determined according to an example of the method for registering the first three-dimensional digital structure 100 and the second three-dimensional digital structure 110 described herein.

Figure 36:
FIG. 36 shows an exemplary second three-dimensional digital structure.
Figure 37:
FIG. 37 shows an exemplary registration of a first three-dimensional digital structure and
a second three-dimensional digital structure.
Figure 38:
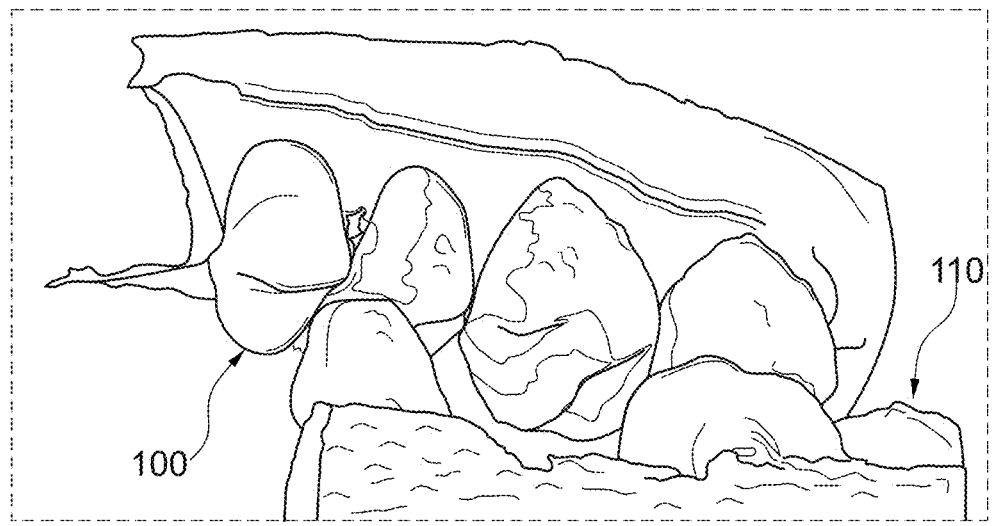
FIG. 38 shows an exemplary registration of a first three-dimensional digital structure and a second three-dimensional digital structure.

FIG. 36 shows an exemplary second three-dimensional digital structure 110. FIGS. 37 and 38 show an exemplary registration of an exemplary third set comprising an exemplary first three-dimensional digital structure 100 and the exemplary second three-dimensional digital structure 110 of FIG. 36 using a rigid spatial transformation determined according to an example of the method for registering the first three-dimensional digital structure 100 and the second three-dimensional digital structure 110 described herein.

Figure 39:
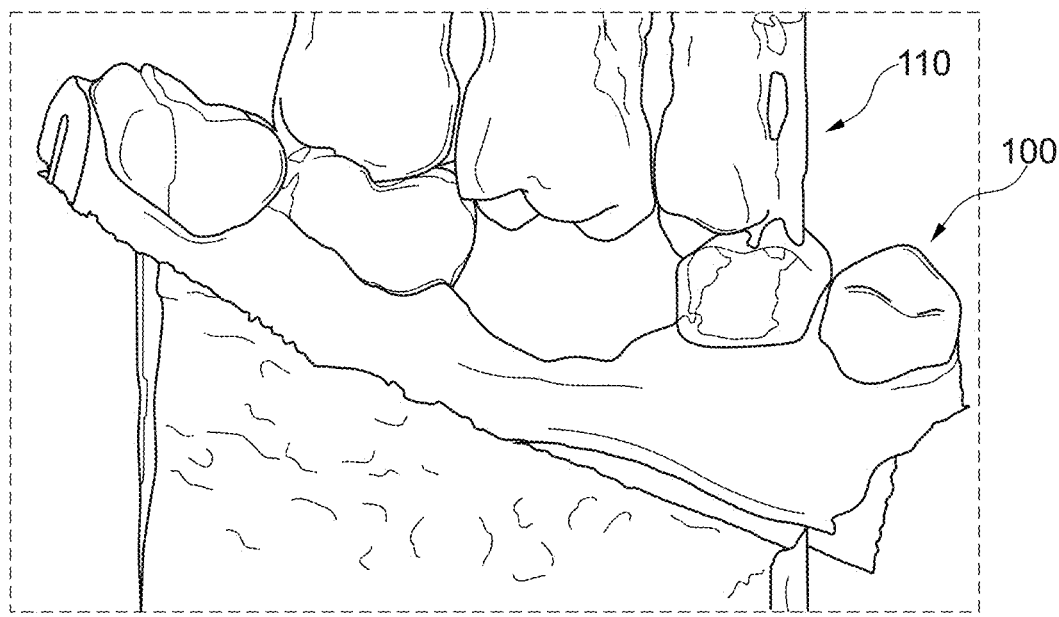
FIG. 39 shows an exemplary registration of a first three-dimensional digital structure and a second three-dimensional digital structure.
Figure 40:
FIG. 40 shows an exemplary registration of a first three-dimensional digital structure and a second three-dimensional digital structure.

FIGS. 39 and 40 show an exemplary registration of an exemplary fourth set comprising an exemplary first three-dimensional digital structure 100 and the exemplary second three-dimensional digital structure 110 of FIG. 36 using a rigid spatial transformation determined according to an example of the method for registering the first three-dimensional digital structure 100 and the second three-dimensional digital structure 110 described herein.

Figure 41:
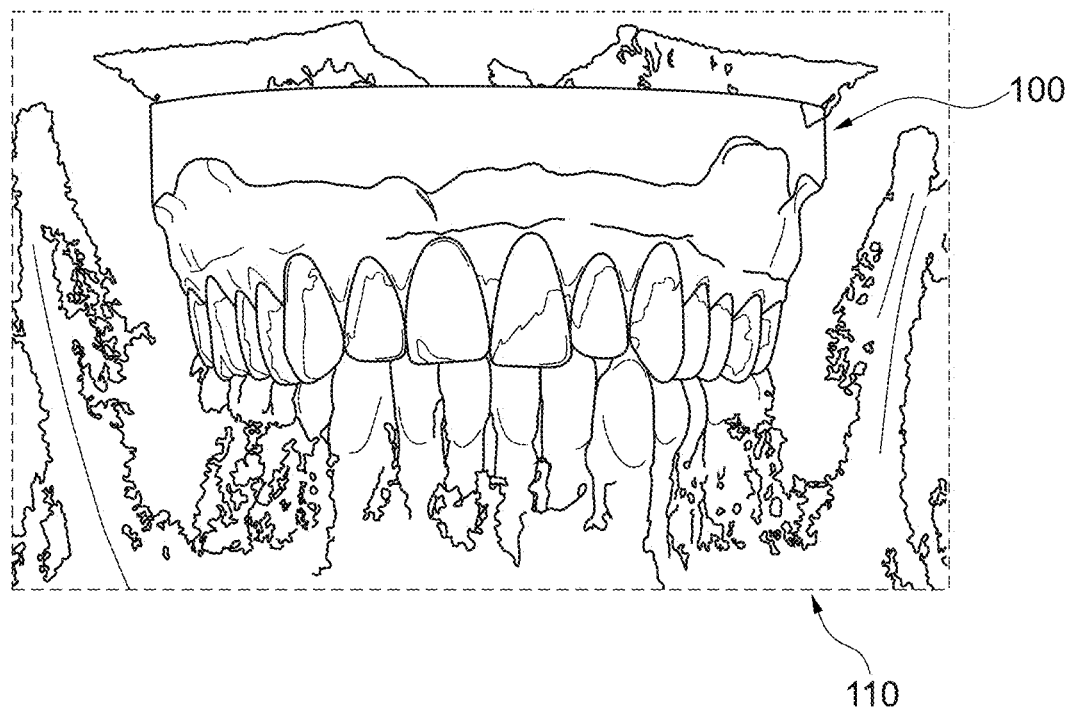
FIG. 41 shows an exemplary registration of a first three-dimensional digital structure and a second three-dimensional digital structure.
Figure 42:
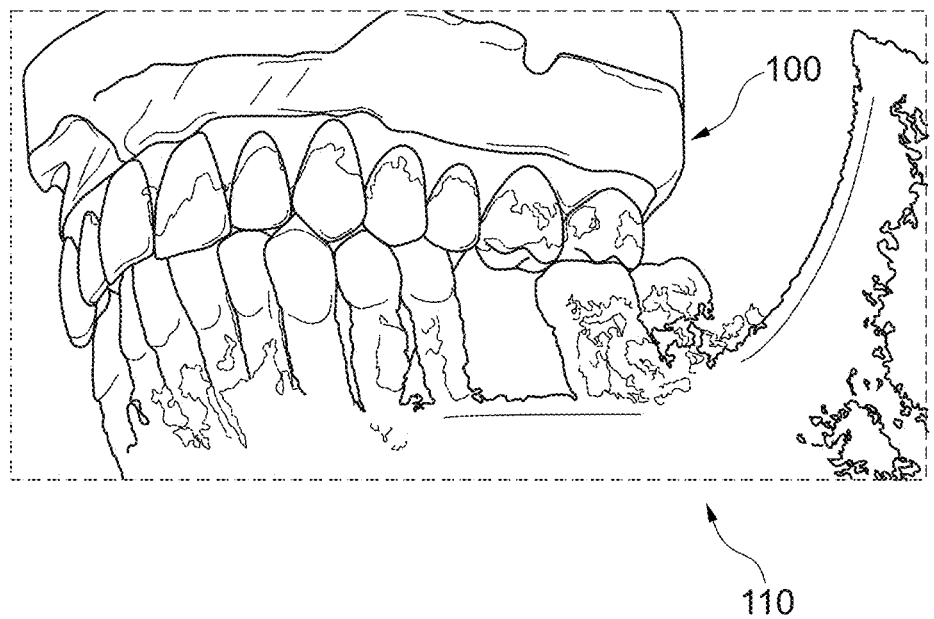
FIG. 42 shows an exemplary registration of a first three-dimensional digital structure and a second three-dimensional digital structure.

FIGS. 41 and 42 show an exemplary registration of an exemplary fifth set comprising an exemplary first three-dimensional digital structure 100 and an exemplary second three-dimensional digital structure 110 using a rigid spatial transformation determined according to an example of the method for registering the first three-dimensional digital structure 100 and the second three-dimensional digital structure 110 described herein.

Figure 43:
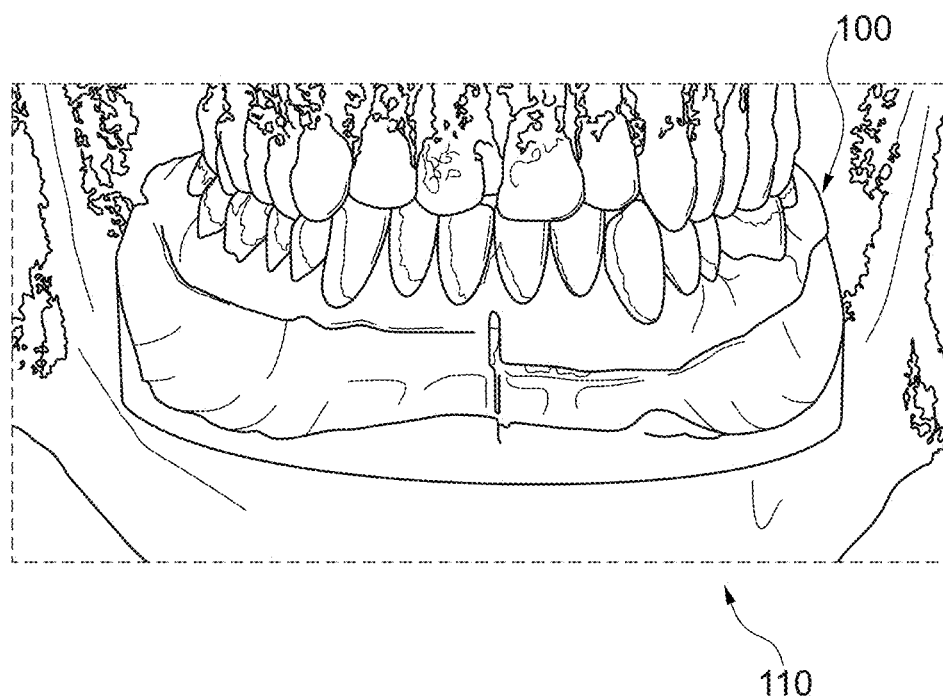
FIG. 43 shows an exemplary registration of a first three-dimensional digital structure and a second three-dimensional digital structure.

FIG. 43 shows an exemplary registration of an exemplary sixth set comprising an exemplary first three-dimensional digital structure 100 and the exemplary second three-dimensional digital structure 110 of FIGS. 41 and 42 using a rigid spatial transformation determined according to an example of the method for registering the first three-dimensional digital structure 100 and the second three-dimensional digital structure 110 described herein.

Figure 44:
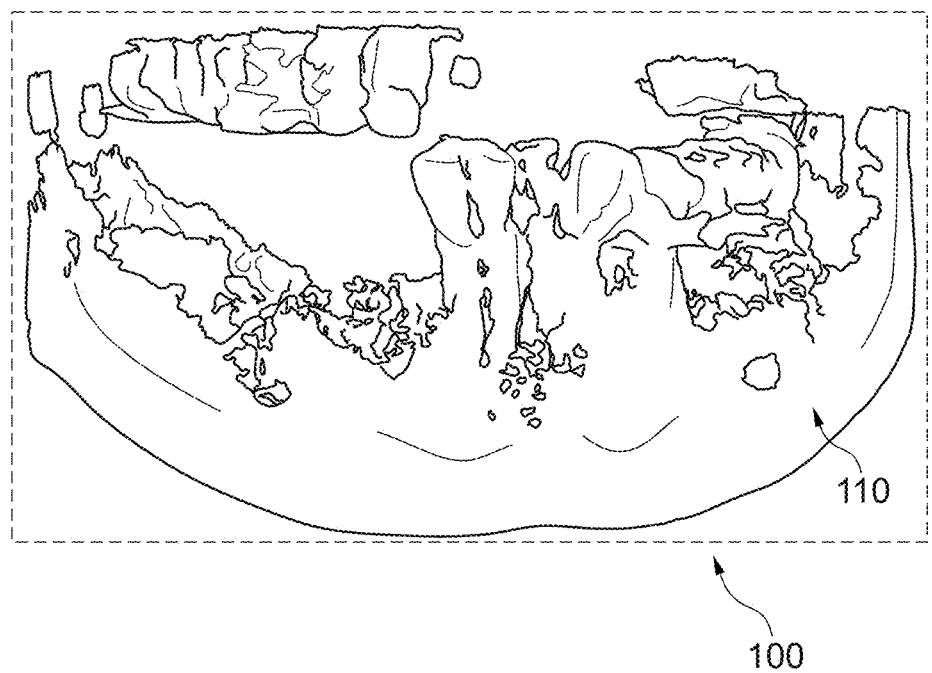
FIG. 44 shows an exemplary second three-dimensional digital structure.
Figure 45:
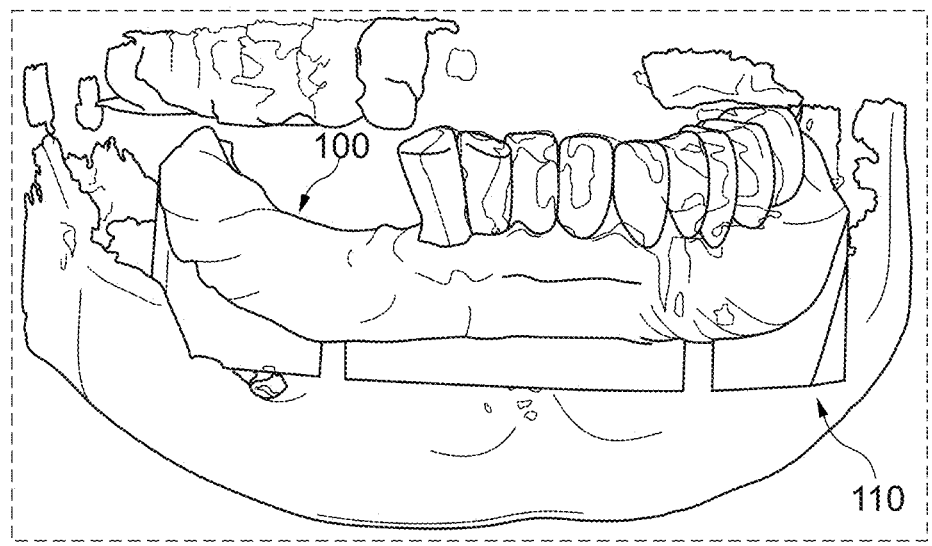
FIG. 45 shows an exemplary registration of a first three-dimensional digital structure and a second three-dimensional digital structure.
Figure 46:
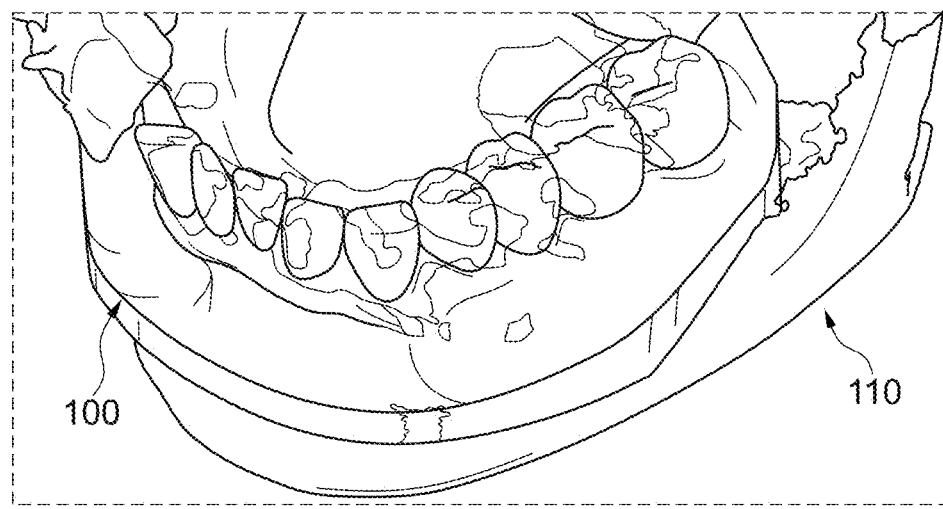
FIG. 46 shows an exemplary registration of a first three-dimensional digital structure and a second three-dimensional digital structure.

FIG. 44 shows an exemplary second three-dimensional digital structure 110. FIGS. 45 and 46 show an exemplary registration of an exemplary seventh set comprising an exemplary first three-dimensional digital structure 100 and the exemplary second three-dimensional digital structure 110 of FIG. 44 using a rigid spatial transformation determined according to an example of the method for registering the first three-dimensional digital structure 100 and the second three-dimensional digital structure 110 described herein.

Figure 47:
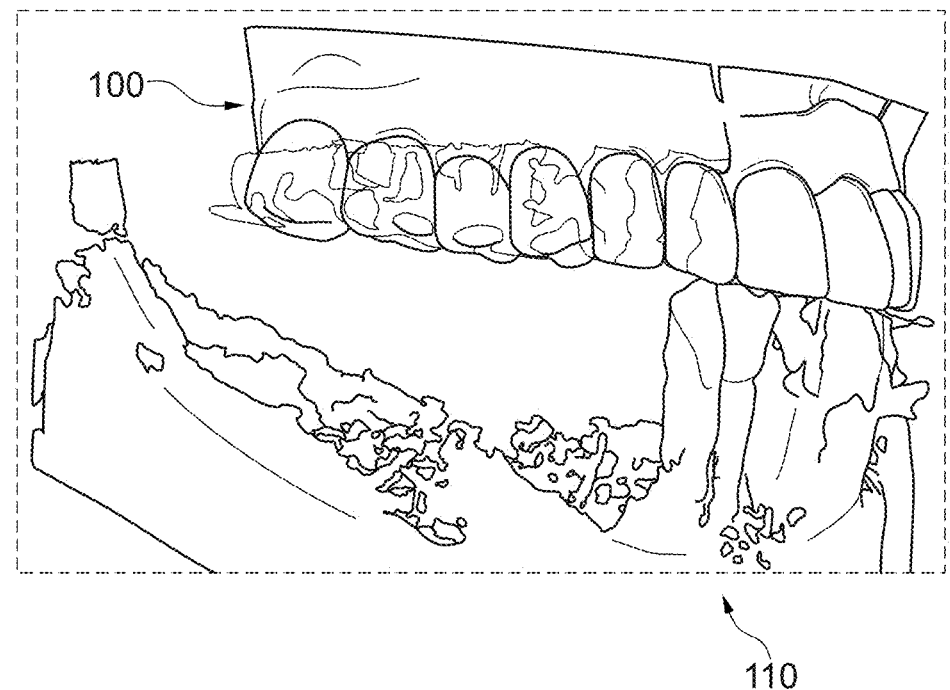
FIG. 47 shows an exemplary registration of a first three-dimensional digital structure and a second three-dimensional digital structure.

FIG. 47 shows an exemplary registration of an exemplary eighth set comprising an exemplary first three-dimensional digital structure 100 and the exemplary second three-dimensional digital structure 110 of FIG. 44 using a rigid spatial transformation determined according to an example of the method for registering the first three-dimensional digital structure 100 and the second three-dimensional digital structure 110 described herein.

Figure 48:
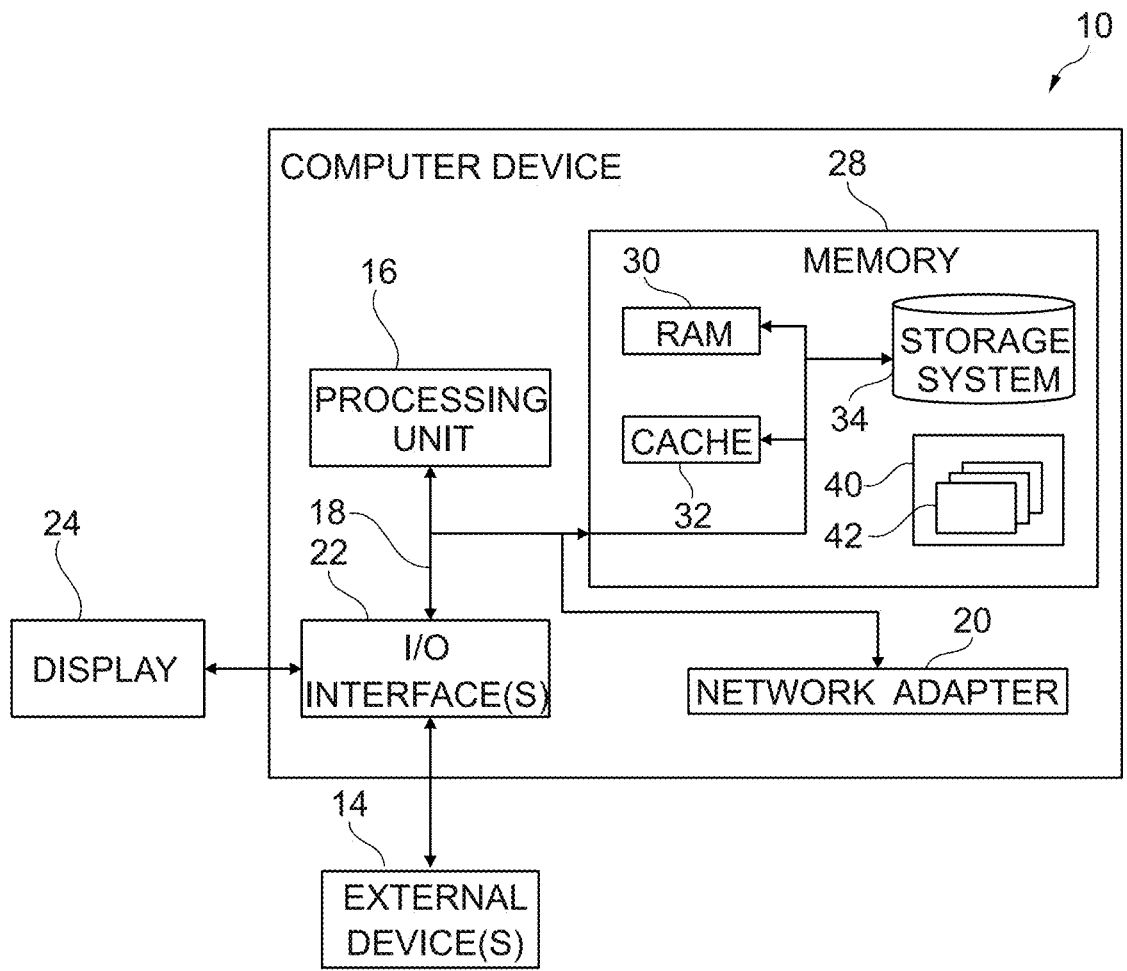
FIG. 48 an exemplary computer device for registering a first three-dimensional digital structure and a second three-dimensional digital structure.

FIG. 48 shows a schematic diagram of an exemplary computer device 10 for registering a first three-dimensional digital structure and a second three-dimensional digital structure. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 48, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include a first three-dimensional digital structure. The first three-dimensional digital structure represents first scan data of a three-dimensional physical structure, e.g., a three-dimensional physical dental structure, like a detention, a maxilla and/or a mandible. Memory 28 may further, e.g., include a second three-dimensional digital structure. The second three-dimensional digital structure represents second scan data of the three-dimensional physical structure. Memory 28 may, e.g., include the first and second scan data of the three-dimensional physical structure. The first scan data may, e.g., be used for generating the first three-dimensional digital structure. The second scan data may, e.g., be used for generating the second three-dimensional digital structure.

Program 40 may have a set of one or more program modules 42 and by way of example be stored in memory 28. The program modules 42 may comprise an operating system, one or more application programs, other program modules, and/or program data. Each of these program modules 42, i.e., the operating system, the one or more application programs, the other program modules, and/or the program data or some combination thereof, may include an implementation of a networking environment. One or more of the program modules 42 may be configured for registering a first three-dimensional digital structure and a second three-dimensional digital structure.

The program modules 42 may, e.g., be configured to control the computer device 10 to receive the first three-dimensional digital structure and the second three-dimensional digital structure. First structural features of the first three-dimensional digital structure are determined using one or more predefined structural criteria. Furthermore, second structural features of the second three-dimensional digital structure are determined using the one or more predefined structural criteria. A first plurality of first feature sets of first structural features is determined. Each of the first feature sets comprises n first structural features of the determined first structural features, wherein the n first structural features are descriptive of a first n-gon and n is a natural number of three or more. A second plurality of second feature sets of second structural features is determined. Each of the second feature sets comprises n second structural features of the determined second structural features, wherein the n second structural features are descriptive of a second n-gon.

Pairs of first and second feature sets are identified, which describe first and second n-gons satisfying a congruence criterion. To each pair of first and second feature set a point in a transformation space is assigned. The assigned point is descriptive for a rigid spatial transformation registering the first n-gon and second n-gon described by the respective pair of first and second feature set. A rigid spatial transformation for registering the first three-dimensional digital structure with the second three-dimensional digital structure is determined using a clustering of the points assigned in the transformation space. The first three-dimensional digital structure and the second three-dimensional digital structure are registered using the determined rigid spatial transformation.

One of the program modules 42 may, e.g., further be configured for generating a three-dimensional digital dental restoration model using the registered first and the second three-dimensional digital structure.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

Figure 49:
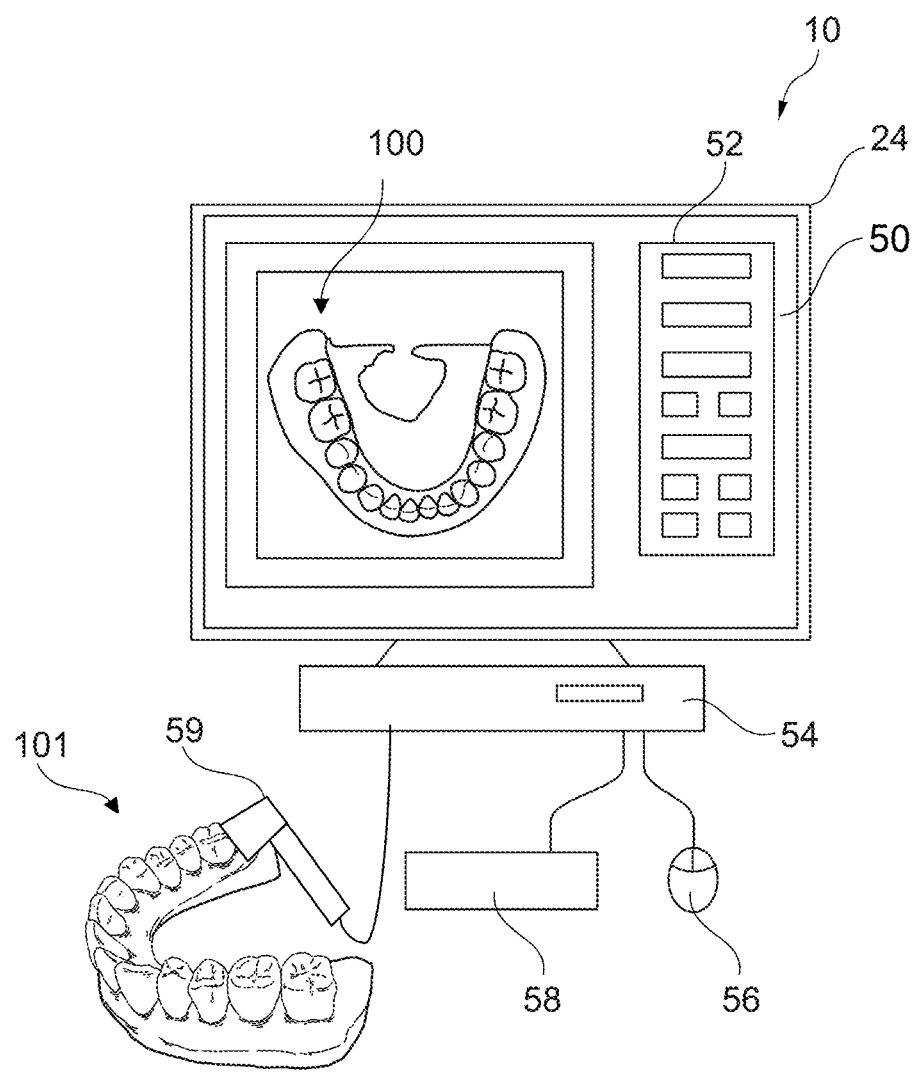
FIG. 49 an exemplary computer device for registering a first three-dimensional digital structure and a second three-dimensional digital structure.

FIG. 49 shows an exemplary computer device 10 for registering a first three-dimensional digital structure and a second three-dimensional digital structure. The computer device 10 may, e.g., be configured as shown in FIG. 48. The computer device 10 may comprise a hardware component 54 comprising one or more processors as well as a memory storing machine-executable program instructions. Execution of the program instructions by the one or more processors may cause the one or more processors to control the computer device 10 to registering a first three-dimensional digital structure and a second three-dimensional digital structure.

The computer device 10 may further comprise one or more input devices, like a keyboard 58 and a mouse 56, enabling a user to interact with the computer device 10. Furthermore, the computer device 10 may comprise one or more output devices, like a display 24 providing a graphical user interface 50 with control elements 52, e.g., GUI elements, enabling the user to control the registering of first and second three-dimensional digital structure. The computer device 10 may further comprise one or more scanners 59, e.g., comprising an intraoral optical scanner, configured for scanning a three-dimensional physical structure 101, e.g., three-dimensional physical dental structure in form of a patient's dentition, maxilla or mandible and generating, e.g., a first three-dimensional digital structure 100. The same way, a second three-dimensional digital structure may be generated scanning the three-dimensional physical structure 101, using the one of the one or more scanners 59. For acquiring scan data for generating the second three-dimensional digital structure the same or a different scanner of the one or more scanners 59 used for acquiring the scan data for generating the first three-dimensional digital structure 100 may be used.

Figure 50:
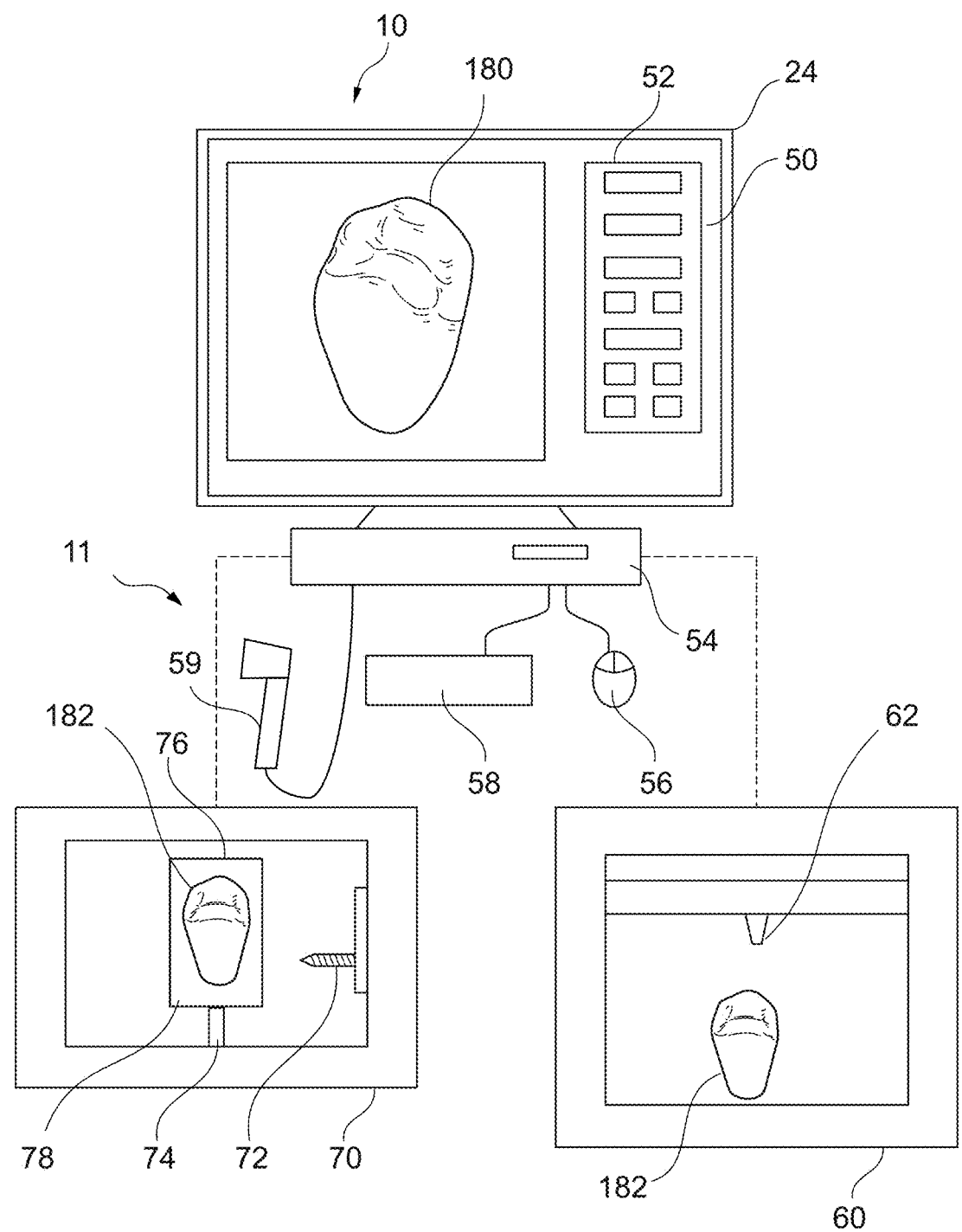
FIG. 50 shows an exemplary system for manufacturing a dental restoration element.

FIG. 50 shows an exemplary manufacturing system 11 for manufacturing a dental restoration element 182. A three-dimensional digital dental restoration model 180 defining the dental restoration element 182 may be provided. This three-dimensional digital dental restoration model 180 may, e.g., be used as a template for manufacturing the dental restoration element 182 as a physical copy of the template. For generating the three-dimensional digital dental restoration model 180, e.g., the registered first and second digital structure may be used. For example, the three-dimensional digital dental restoration model 180 may define a dental restoration element 182 to be used to restore a tooth of a three-dimensional physical dental structure at least partially represented by the first and second digital structure. The first and second digital structure may, e.g., used for determining a geometric form and size of the three-dimensional digital dental restoration model 180 as a template for the dental restoration element 182, in order to ensure that the dental restoration element 182 will correctly fit into a patient's dentition.

The manufacturing system 11 may comprise the computer device 10 of FIG. 48. The computer device 10 may further be configured to control one or more manufacturing devices 60, 70. For example, the manufacturing system 11 may comprise a manufacturing device in form of a machining device 70 controlled by the computer device 10. The machining device 70 may be configured to machining a blank 76 using one or more machining tools 72. The blank 76 of raw material 78, may be provided using a holding device 74 and cut into a desired shape and size of the element to be manufactured, e.g., the dental restoration element 182. The machining tool 72 may, e.g., be a milling tool.

For example, the manufacturing system 11 may comprise a manufacturing device in form of a 3D printing device 60. The 3D printing device 60 may be controlled by the computer device 10 and configured to print an element to be manufactured, e.g., the dental restoration element. The 3D printing device 60 may comprise a printing element 62 configured to print the respective element, like the dental restoration element 182, layer by layer. The printing element 62 may, e.g., comprise a nozzle configured for distributing printing material.

In case the element to be manufactured using the 3D printing device 60 is made using metal, the 3D printing device 60 may, e.g., be configured for executing selective laser sintering or melting. Selective laser sintering uses a laser for sintering a powdered material, aiming the laser automatically at points in space defined by a three-dimensional digital model of the element to be printed. The laser energy may result in a local sintering or melting of the powdered material, binding the material together to create a solid structure. For example, the printing element 62 of the 3D printing device 60 may comprise a laser and/or a distributing device for distributing the powdered material.

For example, the three-dimensional digital restoration model may be used as a positive to define a negative of the physical dental restoration element in form of a negative three-dimensional digital restoration model. The negative three-dimensional digital restoration model may be used to manufacture, e.g., using machining device 70 or 3D printing device 60, a casting matrix. The casting matrix may be configured for casting the physical dental restoration element 182 by inserting restoration material into the casting matrix and curing the inserted restoration material.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. For example, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. For example, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Although the invention has been described in reference to specific embodiments, it should be understood that the invention is not limited to these examples only and that many variations of these embodiments may be readily envisioned by the skilled person after having read the present disclosure. The invention may thus further be described without limitation and by way of example only by the following embodiments. The following embodiments may contain preferred embodiments. Accordingly, the term "feature combination" as used therein may refer to such a "preferred embodiment".

1. A method for registering a first three-dimensional digital structure and a second three-dimensional digital structure, the first three-dimensional digital structure representing first scan data of a three-dimensional physical structure, the second three-dimensional digital structure representing second scan data of the three-dimensional physical structure, the method comprising:
   receiving the first three-dimensional digital structure;
   receiving the second three-dimensional digital structure;
   determining first structural features of the first three-dimensional digital structure using one or more predefined structural criteria;
   determining second structural features of the second three-dimensional digital structure using the one or more predefined structural criteria;
   defining a first plurality of first feature sets of first structural features, each of the first feature sets comprising n first structural features of the determined first structural features with the n first structural features being descriptive of a first n-gon, wherein n is a natural number of three or more;
   defining a second plurality of second feature sets of second structural features, each of the second feature set comprising n second structural features of the determined second structural features with the n second structural features being descriptive of a second n-gon;
   identifying pairs of first and second feature sets describing first and second n-gons satisfying a congruence criterion;
   assigning to each pair of first and second feature set a point in a transformation space, the assigned point being descriptive for a rigid spatial transformation registering the first n-gon and second n-gon described by the respective pair of first and second feature set;

determining a rigid spatial transformation for registering the first three-dimensional digital structure with the second three-dimensional digital structure using a clustering of the points assigned in the transformation space;

registering the first three-dimensional digital structure and the second three-dimensional digital structure using the determined rigid spatial transformation.

2. The method of feature combination 1, the first structural features being descriptive of distinctive surface properties of a first surface of the first three-dimensional digital structure, the second structural features being descriptive of distinctive surface properties of a second surface of the second three-dimensional digital structure.

3. The method of feature combination 2, the first and the second surface each being represented by a polygon mesh comprising a plurality of vertices and edges.

4. The method of feature combination 3, further comprising for each of the first and the second surface merging the vertices to define regions of the mesh of the respective surface, each region comprising one or more vertices.

5. The method of feature combination 4, the merging of the vertices for each of the first and the second surface comprising assigning edge values to the edges defining an order for the merging of the vertices along the edges of the mesh of the respective surface according to the assigned edge values.

6. The method of feature combination 5, the merging of the vertices for each of the first and the second surface comprising following the order for the merging defined by the edge values of the respective surface:

determining edges connecting regions satisfying one or more predefined merging criteria, for each of the determined edges merging of the regions connected by the respective edge.

7. The method of any of feature combinations 4 to 6, further comprising for each of the first and the second surface determining regions of interest comprised by the regions resulting from the merging of the respective surface using the one or more predefined structural criteria.

8. The method of feature combination 7, the first structural features being comprised by the regions of interest of the first surface, the second structural features being comprised by the regions of interest of the second surface.

9. The method of feature combination 8, the first and second structural features each being represented by feature points of the regions of interest comprising the respective structural feature, the feature points of the regions of interest each being provided by an extremum within the respective region of interest.

10. The method of any of the preceding feature combinations, the number n of first structural features per first feature set and of second structural features per second feature set being n equals three.

11. The method of any of the preceding feature combinations, comprising selecting the first and second n-gons for the pairing using a predefined pairing criterion.

12. The method of feature combination 11, the predefined pairing criterion for selecting the first and second n-gons requiring an area of the respective n-gons to exceed a predefined minimum area.

13. The method of any of the preceding feature combinations, the first and second n-gons being paired as pairs of n-gons having a degree of congruence exceeding a predefined minimum degree of congruence.

14. The method of any of the preceding feature combinations, the transformation space being a k-dimensional transformation space.

15. The method of any of the preceding feature combinations, further comprising a clustering of the points in the transformation space.

16. The method of any of the preceding feature combinations, further comprising identifying a plurality of clusters as a result of the clustering with each cluster representing a rigid spatial transformation, selecting one of the clusters for determining the rigid spatial transformation for registering the first three-dimensional digital structure with the second three-dimensional digital structure.

17. The method of feature combination 16, further comprising determining the rigid spatial transformations represented by the identified clusters, the determining of the rigid spatial transformations comprising determining points of the identified clusters, each of the determined points being a point in the transformation space representing a specific rigid spatial transformation.

18. The method of feature combination 17, further comprising calculating a surface fit error for one or more of the rigid spatial transformations represented by the determined points of the identified clusters.

19. The method of feature combination 18, further comprising selecting from the rigid spatial transformations represented by the identified clusters a rigid spatial transformation with a smallest surface fit error as the rigid spatial transformation for registering the first three-dimensional digital structure with the second three-dimensional digital structure.

20. The method of any of the preceding feature combinations, the first three-dimensional digital structure being a first three-dimensional digital dental structure representing first scan data of a three-dimensional physical dental structure, the second three-dimensional digital structure being a second three-dimensional digital dental structure representing second scan data of a three-dimensional physical dental structure.

21. A computer program for registering a first three-dimensional digital structure and a second three-dimensional digital structure, the first three-dimensional digital structure representing first scan data of a three-dimensional physical structure, the second three-dimensional digital structure representing second scan data of the three-dimensional physical structure, the computer program comprising program instructions, the program instructions being executable by a processor of a computer device to cause the computer device to:

receive the first three-dimensional digital structure;

receive the second three-dimensional digital structure;

determine first structural features of the first three-dimensional digital structure using one or more predefined structural criteria;

determine second structural features of the second three-dimensional digital structure using the one or more predefined structural criteria;

define a first plurality of first feature sets of first structural features, each of the first feature sets comprising n first structural features of the determined first structural features with the n first structural features being descriptive of a first n-gon, wherein n is a natural number of three or more;

define a second plurality of second feature sets of second structural features, each of the second feature set comprising n second structural features of the determined second structural features with the n second structural features being descriptive of a second n-gon;

identify pairs of first and second feature sets describing first and second n-gons satisfying a congruence criterion;

assign to each pair of first and second feature set a point in a transformation space, the assigned point being descriptive for a rigid spatial transformation registering the first n-gon and second n-gon described by the respective pair of first and second feature set;

determine a rigid spatial transformation for registering the first three-dimensional digital structure with the second three-dimensional digital structure using a clustering of the points assigned in the transformation space;

register the first three-dimensional digital structure and the second three-dimensional digital structure using the determined rigid spatial transformation.

22. A computer program product for registering a first three-dimensional digital structure and a second three-dimensional digital structure, the first three-dimensional digital structure representing first scan data of a three-dimensional physical structure, the second three-dimensional digital structure representing second scan data of the three-dimensional physical structure, the computer program product comprising a computer readable storage medium having program instructions embodied therewith, the program instructions being executable by a processor of a computer device to cause the computer device to:

receive the first three-dimensional digital structure;

receive the second three-dimensional digital structure;

determine first structural features of the first three-dimensional digital structure using one or more predefined structural criteria;

determine second structural features of the second three-dimensional digital structure using the one or more predefined structural criteria;

define a first plurality of first feature sets of first structural features, each of the first feature sets comprising n first structural features of the determined first structural features with the n first structural features being descriptive of a first n-gon, wherein n is a natural number of three or more;

define a second plurality of second feature sets of second structural features, each of the second feature set comprising n second structural features of the determined second structural features with the n second structural features being descriptive of a second n-gon;

identify pairs of first and second feature sets describing first and second n-gons satisfying a congruence criterion;

assign to each pair of first and second feature set a point in a transformation space, the assigned point being descriptive for a rigid spatial transformation registering the first n-gon and second n-gon described by the respective pair of first and second feature set;

determine a rigid spatial transformation for registering the first three-dimensional digital structure with the second three-dimensional digital structure using a clustering of the points assigned in the transformation space;

register the first three-dimensional digital structure and the second three-dimensional digital structure using the determined rigid spatial transformation.

23. A computer device for registering a first three-dimensional digital structure and a second three-dimensional digital structure, the first three-dimensional digital structure representing first scan data of a three-dimensional physical structure, the second three-dimensional digital structure representing second scan data of the three-dimensional physical structure, the computer device comprising a processor and a memory storing program instructions executable by the processor, execution of the program instructions by the processor causing the computer device to:

receive the first three-dimensional digital structure;

receive the second three-dimensional digital structure;

determine first structural features of the first three-dimensional digital structure using one or more predefined structural criteria;

determine second structural features of the second three-dimensional digital structure using the one or more predefined structural criteria;

define a first plurality of first feature sets of first structural features, each of the first feature sets comprising n first structural features of the determined first structural features with the n first structural features being descriptive of a first n-gon, wherein n is a natural number of three or more;

define a second plurality of second feature sets of second structural features, each of the second feature set comprising n second structural features of the determined second structural features with the n second structural features being descriptive of a second n-gon;

identify pairs of first and second feature sets describing first and second n-gons satisfying a congruence criterion;

assign to each pair of first and second feature set a point in a transformation space, the assigned point being descriptive for a rigid spatial transformation registering the first n-gon and second n-gon described by the respective pair of first and second feature set;

determine a rigid spatial transformation for registering the first three-dimensional digital structure with the second three-dimensional digital structure using a clustering of the points assigned in the transformation space;

register the first three-dimensional digital structure and the second three-dimensional digital structure using the determined rigid spatial transformation.

REFERENCE SIGNS LIST

10 computer device
11 manufacturing system
14 external device
16 processing unit
18 bus
20 network adapter
22 I/O interface 24 display
28 memory
30 RAM
32 cache
34 storage system
40 program
42 program module
50 user interface
52 control elements
54 hardware device
56 keyboard
58 mouse
59 scanner
60 3D printing device
62 printing element
70 machining device
72 machining tool
74 holding device
76 blank
78 restoration material
100 3D digital structure
101 3D physical structure
112 tooth
120 normal vector
122 point
124 normal plain
126 normal section
132 vertex
134 edge
136 region
138 region of interest
139 structural feature
140 n-gon
142 extreme vertex
146 axis-aligned bounding box
148 distance vector
150 rigid spatial transformation
152 points in transformation space
154 cluster
156 mean
169 structural feature

The invention claimed is:

1. A computer-implemented method for registering a first three-dimensional digital structure and a second three-dimensional digital structure, the first three-dimensional digital structure representing first scan data of a three-dimensional physical structure, the second three-dimensional digital structure representing second scan data of the three-dimensional physical structure,
the method comprising:
receiving the first three-dimensional digital structure;
receiving the second three-dimensional digital structure;
determining first structural features of the first three-dimensional digital structure using one or more predefined structural criteria;
determining second structural features of the second three-dimensional digital structure using the one or more predefined structural criteria;
defining a first plurality of first feature sets of first structural features, each of the first feature sets comprising n first structural features of the determined first structural features with the n first structural features being descriptive of a first n-gon, wherein n is a natural number of three or more;
defining a second plurality of second feature sets of second structural features, each of the second feature set comprising n second structural features of the determined second structural features with the n second structural features being descriptive of a second n-gon;
identifying pairs of first and second feature sets describing first and second n-gons satisfying a congruence criterion;
assigning to each pair of first and second feature set a point in a transformation space, the assigned point being descriptive for a rigid spatial transformation registering the first n-gon and second n-gon described by the respective pair of first and second feature set;
determining a rigid spatial transformation for registering the first three-dimensional digital structure with the second three-dimensional digital structure using a clustering of the points assigned in the transformation space;
registering the first three-dimensional digital structure and the second three-dimensional digital structure using the determined rigid spatial transformation.

2. The method of claim 1, the first structural features being descriptive of distinctive surface properties of a first surface of the first three-dimensional digital structure,
the second structural features being descriptive of distinctive surface properties of a second surface of the second three-dimensional digital structure.

3. The method of claim 2, the first and the second surface each being represented by a polygon mesh comprising a plurality of vertices and edges.

4. The method of claim 3, further comprising for each of the first and the second surface merging the vertices to define regions of the mesh of the respective surface, each region comprising one or more vertices.

5. The method of claim 4, the merging of the vertices for each of the first and the second surface comprising assigning edge values to the edges defining an order for the merging of the vertices along the edges of the mesh of the respective surface according to the assigned edge values.

6. The method of claim 5, the merging of the vertices for each of the first and the second surface comprising following the order for the merging defined by the edge values of the respective surface:
determining edges connecting regions satisfying one or more predefined merging criteria,
for each of the determined edges merging of the regions connected by the respective edge.

7. The method of claim 4, further comprising for each of the first and the second surface determining regions of interest comprised by the regions resulting from the merging of the respective surface using the one or more predefined structural criteria.

8. The method of claim 7, the first structural features being comprised by the regions of interest of the first surface, the second structural features being comprised by the regions of interest of the second surface.

9. The method of claim 8, the first and second structural features each being represented by feature points of the regions of interest comprising the respective structural feature, the feature points of the regions of interest each being provided by an extremum within the respective region of interest.

10. The method of claim 1, comprising selecting the first and second n-gons for the identifying of the pairs of first and second feature sets using a predefined pairing criterion.

11. The method of claim 10, the predefined pairing criterion for selecting the first and second n-gons requiring an area of the respective n-gons to exceed a predefined minimum area.

12. The method of claim 1, the first and second n-gons being paired as pairs of n-gons having a degree of congruence exceeding a predefined minimum degree of congruence.

13. The method of claim 1, further comprising a clustering of the points in the transformation space.

14. The method of claim 1, further comprising identifying a plurality of clusters as a result of the clustering with each cluster representing a rigid spatial transformation,
selecting one of the clusters for determining the rigid spatial transformation for registering the first three-dimensional digital structure with the second three-dimensional digital structure.

15. The method of claim 14, further comprising determining the rigid spatial transformations represented by the identified clusters, the determining of the rigid spatial transformations comprising determining points of the identified clusters, each of the determined points being a point in the transformation space representing a specific rigid spatial transformation.

16. The method of claim 15, further comprising calculating a surface fit error for one or more of the rigid spatial transformations represented by the determined points of the identified clusters.

17. The method of claim 16, further comprising selecting from the rigid spatial transformations represented by the identified clusters a rigid spatial transformation with a smallest surface fit error as the rigid spatial transformation for registering the first three-dimensional digital structure with the second three-dimensional digital structure.

18. The method of claim 1, the first three-dimensional digital structure being a first three-dimensional digital dental structure representing first scan data of a three-dimensional physical dental structure, the second three-dimensional digital structure being a second three-dimensional digital dental structure representing second scan data of a three-dimensional physical dental structure.

19. A computer program product for registering a first three-dimensional digital structure and a second three-dimensional digital structure, the first three-dimensional digital structure representing first scan data of a three-dimensional physical structure, the second three-dimensional digital structure representing second scan data of the three-dimensional physical structure,
the computer program product comprising a non-transitory computer readable storage medium having program instructions embodied therewith, the program instructions being executable by a processor of a computer device to cause the computer device to:
receive the first three-dimensional digital structure;
receive the second three-dimensional digital structure;
determine first structural features of the first three-dimensional digital structure using one or more predefined structural criteria;
determine second structural features of the second three-dimensional digital structure using the one or more predefined structural criteria;
define a first plurality of first feature sets of first structural features, each of the first feature sets comprising n first structural features of the determined first structural features with the n first structural features being descriptive of a first n-gon, wherein n is a natural number of three or more;
define a second plurality of second feature sets of second structural features, each of the second feature set comprising n second structural features of the determined second structural features with the n second structural features being descriptive of a second n-gon;
identify pairs of first and second feature sets describing first and second n-gons satisfying a congruence criterion;
assign to each pair of first and second feature set a point in a transformation space, the assigned point being descriptive for a rigid spatial transformation registering the first n-gon and second n-gon described by the respective pair of first and second feature set;
determine a rigid spatial transformation for registering the first three-dimensional digital structure with the second three-dimensional digital structure using a clustering of the points assigned in the transformation space;
register the first three-dimensional digital structure and the second three-dimensional digital structure using the determined rigid spatial transformation.

20. A computer device for registering a first three-dimensional digital structure and a second three-dimensional digital structure, the first three-dimensional digital structure representing first scan data of a three-dimensional physical structure, the second three-dimensional digital structure representing second scan data of the three-dimensional physical structure,
the computer device comprising a processor and a memory storing program instructions executable by the processor, execution of the program instructions by the processor causing the computer device to:
receive the first three-dimensional digital structure;
receive the second three-dimensional digital structure;
determine first structural features of the first three-dimensional digital structure using one or more predefined structural criteria;
determine second structural features of the second three-dimensional digital structure using the one or more predefined structural criteria;
define a first plurality of first feature sets of first structural features, each of the first feature sets comprising n first structural features of the determined first structural features with the n first structural features being descriptive of a first n-gon, wherein n is a natural number of three or more;
define a second plurality of second feature sets of second structural features, each of the second feature set comprising n second structural features of the determined second structural features with the n second structural features being descriptive of a second n-gon;
identify pairs of first and second feature sets describing first and second n-gons satisfying a congruence criterion;
assign to each pair of first and second feature set a point in a transformation space, the assigned point being descriptive for a rigid spatial transformation registering the first n-gon and second n-gon described by the respective pair of first and second feature set;
determine a rigid spatial transformation for registering the first three-dimensional digital structure with the second three-dimensional digital structure using a clustering of the points assigned in the transformation space;
register the first three-dimensional digital structure and the second three-dimensional digital structure using the determined rigid spatial transformation.

* * * * *